US012496172B2

(12) United States Patent
Cofar et al.

(10) Patent No.: US 12,496,172 B2
(45) Date of Patent: Dec. 16, 2025

(54) COMPUTER IMPLEMENTED METHODS FOR DENTAL DESIGN

(71) Applicant: SMILECLOUD SRL, Timisoara (RO)

(72) Inventors: Florin-Nicolae Cofar, Dumbravita (RO); Eric Van Dooren, Wilrijk (BE); Mihai Simonia, Timisoara (RO); Cristian Diaconescu, Timisoara (RO); Radu-Florin Sarghe, Timisoara (RO); Cristian-Florin Marta, Timisoara (RO)

(73) Assignee: SMILECLOUD SRL, Timisoara (RO)

( * ) Notice: Subject to any disclaimer, the term of this patent is extended or adjusted under 35 U.S.C. 154(b) by 1000 days.

(21) Appl. No.: 17/400,377

(22) Filed: Aug. 12, 2021

(65) Prior Publication Data
US 2021/0393380 A1 Dec. 23, 2021

Related U.S. Application Data

(63) Continuation-in-part of application No. 17/428,355, filed as application No. PCT/EP2020/052638 on Feb. 3, 2020.

(30) Foreign Application Priority Data

Feb. 6, 2019 (EP) .................................... 19155845

(51) Int. Cl.
*A61C 13/00* (2006.01)
*G06T 11/60* (2006.01)
(Continued)

(52) U.S. Cl.
CPC .......... *A61C 13/0004* (2013.01); *G06T 11/60* (2013.01); *G06T 19/20* (2013.01);
(Continued)

(58) Field of Classification Search
CPC ..... A61C 13/0004; G06T 11/60; G06T 19/20; G06T 2210/41; G06T 2219/2021;
(Continued)

(56) References Cited

U.S. PATENT DOCUMENTS

2009/0148816 A1 6/2009 Marshall et al.
2010/0145898 A1* 6/2010 Malfliet ................. G06V 20/20
703/1

(Continued)

FOREIGN PATENT DOCUMENTS

| EP | 3639787 A1 * | 4/2020 | ............. A61B 34/30 |
| JP | 4614517 B2 * | 1/2011 | |
| WO | WO-2016054744 A1 * | 4/2016 | ............... A61B 1/24 |

OTHER PUBLICATIONS

Sesemann "Appropriate Line Angles to Optimize Smile Design Restorations", Journal of Cosmetic Dentistry Fall 2017 vol. 33 No. 3 (Year: 2017).*

(Continued)

*Primary Examiner* — Rehana Perveen
*Assistant Examiner* — Troy A Maust
(74) *Attorney, Agent, or Firm* — KDW Firm PLLC

(57) ABSTRACT

A computer implemented method of generating a dental design comprising the steps of: a) displaying a 2D image of a smile containing at least two teeth; b) displaying a plurality of visual objects, preferably including a lower curve to characterise said teeth; c) performing at least once: i) determining a limited set of parameters for said teeth based on said visual objects; ii) searching and retrieving a limited number of candidate matching teeth from a digital library; iii) proposing or selecting a matching tooth from said candidate matching teeth; vii) displaying the 2D image with an overlay of the proposed or selected matching teeth. Optionally saving the digital design, providing a 3D digital (Continued)

file, producing a physical object. A computer program product is described herein. A method of dental treatment is described herein.

16 Claims, 21 Drawing Sheets

(51) Int. Cl.
*G06T 19/20* (2011.01)
*G16H 50/70* (2018.01)
*A61B 1/24* (2006.01)
G06F 3/04845 (2022.01)
G06F 3/0486 (2013.01)

(52) U.S. Cl.
CPC ............... G16H 50/70 (2018.01); *A61B 1/24* (2013.01); *G06F 3/04845* (2013.01); *G06F 3/0486* (2013.01); *G06T 2210/41* (2013.01); *G06T 2219/2021* (2013.01)

(58) Field of Classification Search
CPC ...... G06T 11/203; G16H 50/70; G16H 20/40; G16H 30/40; G16H 50/50; A61B 1/24; G06F 3/04845; G06F 3/0486
See application file for complete search history.

(56) References Cited

U.S. PATENT DOCUMENTS

| 2013/0060532 | A1* | 3/2013 | Clausen | A61C 13/08 |
| | | | | 703/1 |
| 2013/0108988 | A1 | 5/2013 | Simoncic | |
| 2013/0282351 | A1 | 10/2013 | Tank | |
| 2015/0056576 | A1* | 2/2015 | Nikolskiy | A61C 9/004 |
| | | | | 433/214 |
| 2015/0111177 | A1* | 4/2015 | Fisker | A61C 9/004 |
| | | | | 433/199.1 |
| 2017/0319293 | A1* | 11/2017 | Fisker | A61C 9/0053 |
| 2018/0204332 | A1* | 7/2018 | Salah | G06V 10/7515 |
| 2018/0263732 | A1* | 9/2018 | Pokotilov | A61C 9/0053 |
| 2023/0390031 | A1* | 12/2023 | Marshall | G16H 40/63 |

OTHER PUBLICATIONS

International Search Report, issued Apr. 15, 2020, pertaining to PCT/EP2020/052638, filed Feb. 3, 2020, 3 pages.
Written Opinion, issued Apr. 15, 2020, pertaining to PCT/EP2020/052638, filed Feb. 3, 2020, 8 pages.

* cited by examiner (a)          (b)

- capturing or generating or providing at least one digital representation of said tooth in its clinical environment
  — 1101

- characterising said tooth in its clinical environment, thereby obtaining a limited set of parameters
  — 1102 d) normalize the digital representation
  — 1103 e) performing colour correction
  — 1104 f) adding the at least one digital representation and adding the limited set of parameters to said digital library
  — 1105

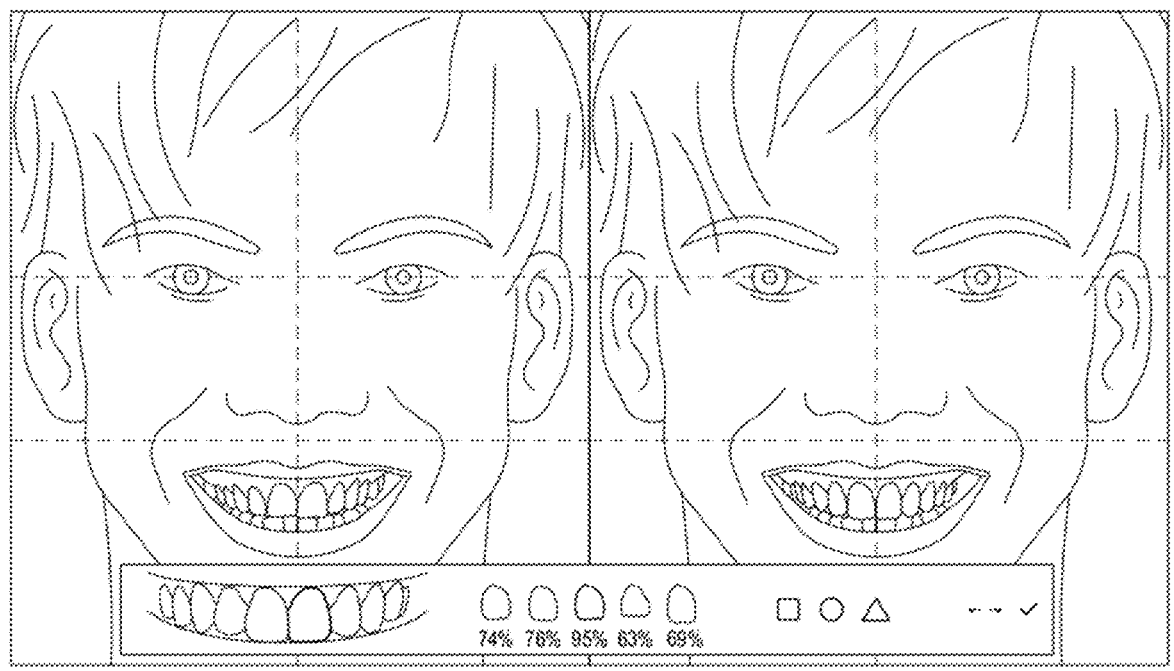
FIG 16

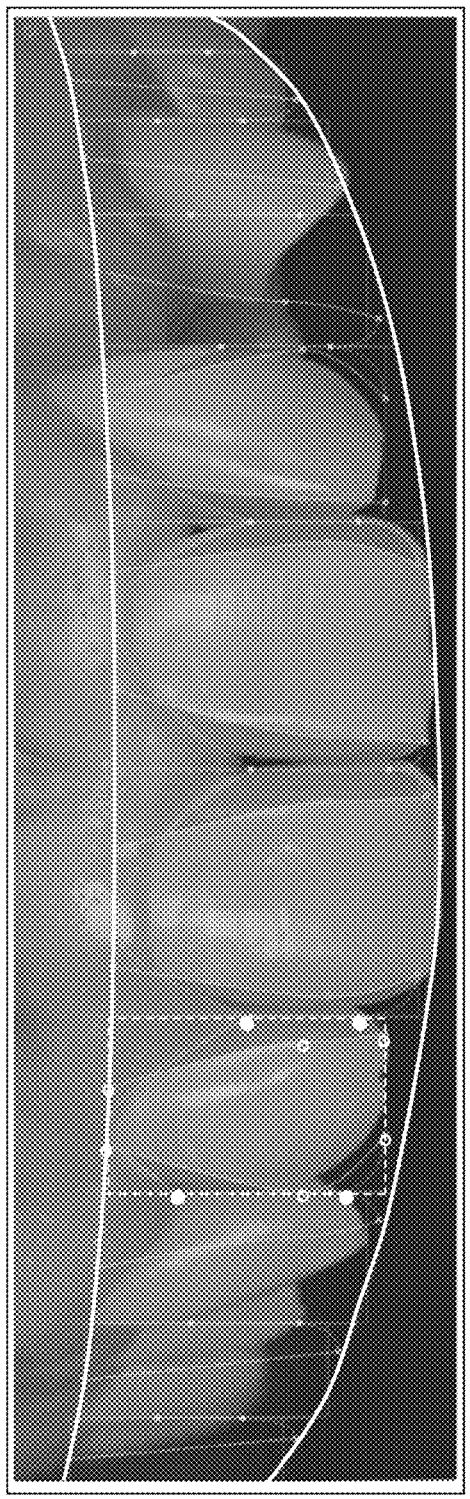
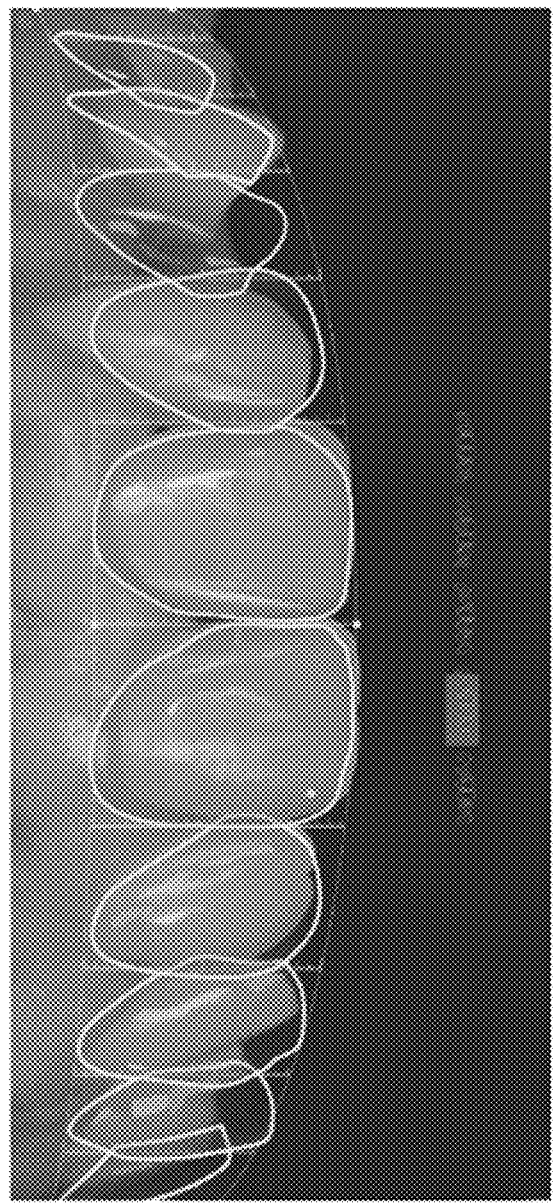
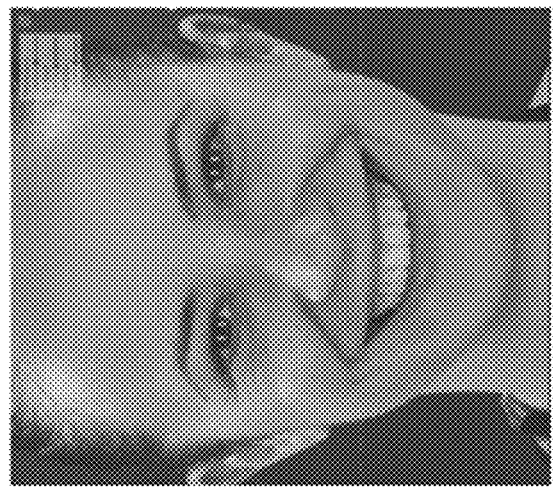
FIG 17

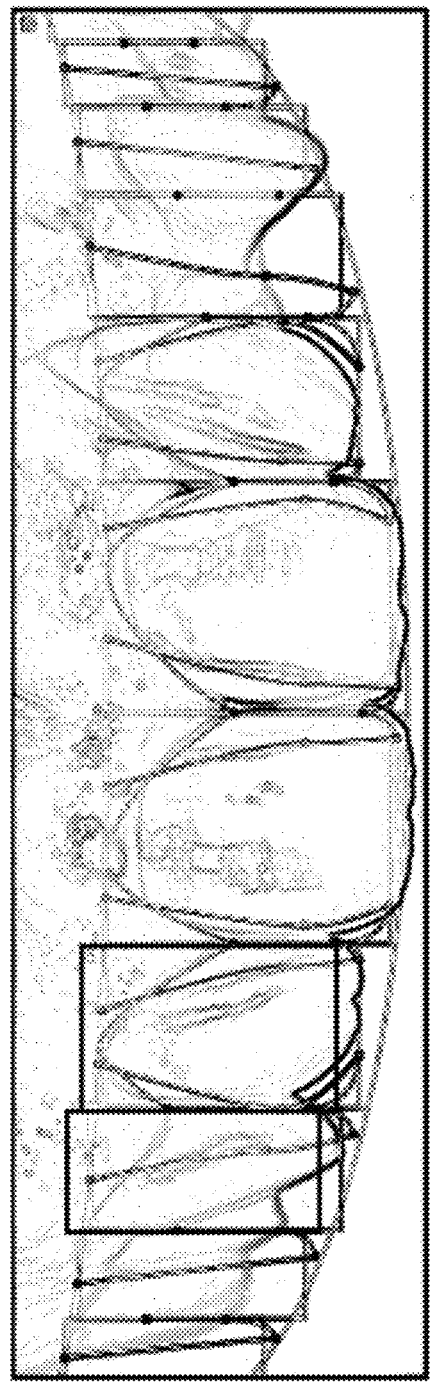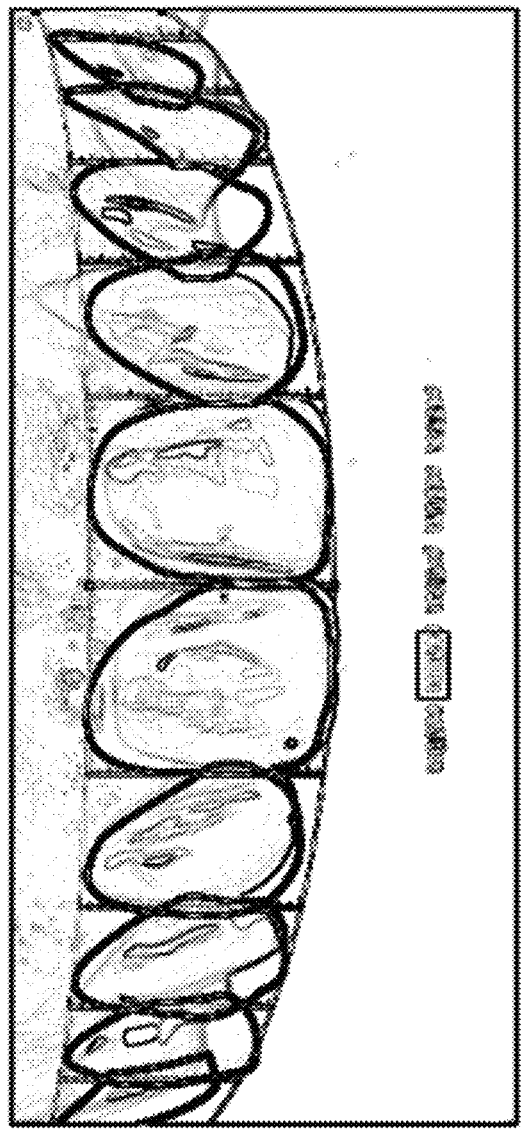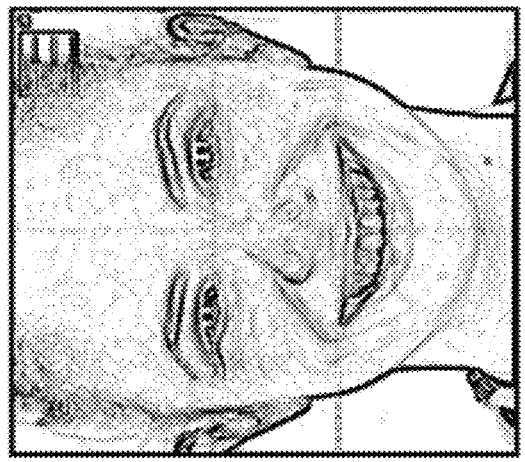
FIG 18

(H=10.14mm; MS of tooth X is 85.4%)

(H=10.56mm; MS of tooth X is 82%)

(H=10.14mm; MS of tooth X is 85.4%)

(H=10.56mm; MS of tooth X is 82%)

(H=10.14mm; MS of tooth X is 85.4%)

(H=10.56mm; MS of tooth X is 82%)

COMPUTER IMPLEMENTED METHODS FOR DENTAL DESIGN

CROSS REFERENCE TO RELATED APPLICATIONS

This application is a continuation-in-part of U.S. application Ser. No. 17/428,355, filed Aug. 4, 2021, which is a National Stage Application of PCT Application No. PCT/EP2020/052638, filed Feb. 3, 2020, which claims priority to European Application No. 19155845.1, filed Feb. 6, 2019, which are incorporated by reference in their entireties.

FIELD OF THE INVENTION

The present invention relates in general to the field of dental design and dental restoration. More in particular, the present invention relates to computer implemented methods for characterising a tooth, computer implemented methods for building a digital database of teeth, computer implemented methods for searching said database to find a matching tooth, computer implemented methods for designing or defining a dental design or restoration, computer implemented methods for generating a physical object for dental restoration, and a method of dental treatment.

BACKGROUND OF THE INVENTION

Techniques for designing and manufacturing dental restorations such as e.g. crowns, bridges, abutments, implants, veneers, etc. are known in the art.

In recent years, computer programs for designing and manufacturing dental restoration are rapidly expanding. A first step in typical computer aided manufacturing processes is to create a 3-dimensional model of the patient's teeth. This is traditionally done by 3D scanning one or both of the dental gypsum models. The 3-dimensional replicas of the teeth are imported into a CAD program, where the entire dental restoration is designed. The final restoration 3D design is then manufactured e.g. using a milling machine, 3D printer, rapid prototyping manufacturing or other manufacturing equipment.

While CAD programs can help to design and visualize virtual 3D objects, it remains a challenge to obtain good results (e.g. accurately fitting, visually appearing, esthetical, etc.) using such programs, moreover in a fast and efficient manner.

US2013/0060532 describes a computer implemented method for designing a high aesthetic composition starting from a high number of interrelated virtual teeth.

There is always room for improvements or alternatives.

SUMMARY OF THE INVENTION

It is an object of embodiments of the present invention to provide a computer implemented method for generating a dental design of a patient in a fast and efficient manner.

It is an object of embodiments of the present invention to show a photo-realistic image of how the smile of the patient will look like after dental treatment, and for adjusting this image in a fast and efficient manner.

It is also an object of embodiments of the present invention to provide a computer program product for performing such a method, and a storage medium comprising such a computer program product, and a computer system for performing such a method.

It is also an object of embodiments of the present invention to provide a method of treatment of a patient using such a method.

These and other objects are accomplished by computer implemented methods, computer program products, and a method of treatment according to embodiments of the present invention.

According to a first aspect, the present invention provides a computer implemented method of generating a dental design, the method comprising the steps of: a) displaying (at least) a 2D image (e.g. a photographic image) comprising a smile (also referred to as "oral space") of a patient comprising a plurality of at least two teeth (e.g. at least two upper teeth); b) displaying a plurality of visual objects (e.g. lines or markers, e.g. a grid comprising an upper curve and a lower curve of the upper teeth, and a plurality of vertical line segments) to characterise said plurality of at least two teeth in said smile; c) performing at least once the following steps: i) determining a limited set of parameters for each of said at least two teeth based on said visual objects; ii) for each of said at least two teeth, searching and retrieving a limited number of candidate matching teeth from a digital library (e.g. a digital library or a digital database of 2D images, e.g. an indexed database of 2D images) of individual teeth using the limited sets of parameters of each tooth, using a matching score for each tooth individually; iii) for each of said at least two teeth, proposing or selecting a matching tooth (e.g. automatically proposing the best matching tooth; or manually selecting another) from the limited number of candidate matching teeth; iv) displaying the 2D image (e.g. a photo-realistic image) of the smile (or oral space) of the patient with an overlay of at least a portion of the proposed or selected matching teeth.

The term "matching score" corresponds to a "degree of agreement". Depending on how the matching score is determined, the degree of agreement takes into account the size and/or shape of the tooth itself, but preferably also takes into account at least one characteristic of the tooth in its environment, e.g. by taking into account one or more characteristics of the gingiva and/or characteristics of a neighbouring tooth.

The 2D image may be a digital photograph. The 2D image may be a frontal image of a face including a smile. The "smile" may also be referred to as "oral space". The at least two teeth may be at least two teeth of an upper jaw, e.g. two central incisors.

The digital library may be an indexed database. The index may comprise one or more or all of the limited set of parameters. The database may comprise a plurality of 2D images. The index file may be stored on a local computer. The 2D images may be stored on a non-volatile memory or on a storage device of the local computer, or on a network server, or in the cloud, or combinations hereof.

An important difference between this method and existing methods (e.g. in commercially available tools) is that the teeth are individually characterized and searched individually, rather than all together, and thus that each tooth is optimized individually. Thus, the end result may be a combination of digital teeth from different people. This is fundamentally different from existing methods.

The result of the "design" can also be a digital file which is printable, which can be used in multiple ways clinically. For example, the file can be used to create a physical object, such as e.g. a tooth, a veneer, a bridge, etc.

It is an advantage that the digital library (or digital database) is searchable in a fast and efficient manner, without having to analyse the pictures or scans while searching the database.

It is a major advantage of this method that it allows fast and easy finding of a "well matching" or even the "best matching" tooth automatically. As far as is known to the inventors, such a function is not provided by prior art solutions, but instead, the user (e.g. dentist) has to manually select a tooth from a catalogue, in which such a choice is very time-consuming and very subjective.

In an embodiment, the 2D image comprises a 2D frontal picture or a 3D facial scan comprising an image of said tooth and at least a portion of a gingiva above said tooth, and a portion of a left neighbouring papilla, and a portion of a right neighbouring papilla.

In an embodiment, step a) may further comprise processing the digital representation, by performing one or more of the following steps: rotating the digital representation, scaling or normalizing the digital representation, cropping the digital representation to keep only the area of interest, detecting a contour of the at least one tooth, correcting a colour of pixels corresponding to gingival or papilla tissue, etc.

In an embodiment, step c) further comprises: allowing a user to adjust and/or modify one or more of said visual objects.

In an embodiment, step c) further comprises: allowing a user to select another matching tooth from the limited set of candidate matching teeth.

In an embodiment, the method further comprises: saving the digital design as a digital file on a non-volatile memory (e.g. a USB stick or a flash card) or on a storage device (e.g. on a hard disk drive, a CD-ROM, a DVD-disk, a Blue-Ray disk). The digital file may comprise one or more of: the first set of limited parameters, a position e.g. in the form of screen coordinates of the plurality of visual objects, a reference to said at least two teeth in the digital library.

In an embodiment, the method further comprises: providing a 3D-file of at least one proposed or selected matching tooth, optionally after scaling. The 3D file may be suitable for printing by a 3D printer. The 3D file may be extracted from, or derived from a library of 3D digital teeth corresponding to the 2D images of teeth. It is an advantage of this embodiment that it generates a 3D-file which can be used to create a physical realisation of the one or more dental restoration. This 3D file may for example be used to build a wax-model.

In an embodiment, the method further comprises: producing at least one physical object based on said 3D file, e.g. in the form of a crown, a bridge, an abutment, an implant, a veneer.

In an embodiment, the plurality of visual objects of step b) include a lower curve defining a height (or a length or an aspect ratio) of at least some, e.g. at least two upper teeth in the smile; and the method further comprises the step of: allowing a user to adjust a position of said lower curve; and adjusting the limited set of parameters of each of said at least two teeth in response to an adjustment of the position of the lower curve.

This "lower curve" may be a U-shaped curve, located near the incisal edges of the upper teeth. It is a major advantage of this "lower curve", that it allows to define or adjust the lengths of multiple teeth simultaneously, with minimum user interaction, and in a consistent manner.

In an embodiment, a position of the lower curve is adjustable by dragging a pointing device (e.g. a mouse, a stylus, a pen, a touchpad, etc.), and wherein the at least partially overlaid 2D image of the patient is dynamically updated as a position of the pointing device is being dragged. A user will experience this as an update in "real-time" or "substantially real-time".

In an embodiment, determining a limited set of parameters comprises: x) determining a parameter indicative for the unique position of the tooth in a mouth; y) determining a limited set of parameters for describing the tooth in a clinical environment, comprising one or more or all of the following parameters: at least two parameter (e.g. H,W or H,P) indicative of for describing a size of said tooth; at least one parameter (e.g. a1) for describing a first papilla height; at least one parameter (e.g. a2) for describing a second papilla height; at least two parameters (e.g. a3, a4, a5 or a6, a7, a8) for describing a shape or a perceived shape of the tooth; at least one parameter (e.g. a5, a9) for describing a first embrasure; at least one parameter (e.g. a8, a10) for describing a second embrasure, for example as illustrated in FIG. 5(a).

The parameter indicative for a position in the mouth may for example be an FDI number (World Dental Federation notation, also known as ISO 3950[2] notation), or a number according to another numbering system, for example the "Palmer notation" (used inter alia in the UK), or the "American numbering system", or any other suitable numbering system.

Typically two parameters are used for each embrasure, but some of these parameters may be commonly used also for specifying the size and/or shape of the tooth.

In an embodiment, the at least two parameters for describing a size of said tooth comprise or consist of two parameters indicative of a height and a width (in 2 dimensions).

In an embodiment, the at least two parameters for describing a size of said tooth comprise or consist of three parameters indicative of a height, a width and a thickness (in 3 dimensions).

In preferred embodiments, the limited set of parameters is less than 20 parameters per tooth, preferably less than 18, or less than 16, or less than 14, or less than 12 parameters per tooth.

Typically two parameters are used for each embrasure, but some of these parameters may be commonly used also for specifying the size and/or shape of the tooth.

In an embodiment, the at least two parameter for describing the shape or perceived shape of the tooth comprise: at least two parameters for describing a single transition line, or at least three parameters for describing one transition curve; or at least two parameters for describing two transition lines; or at least five parameters for describing one transition line and one transition curve; or at least six parameters for describing two transition curves.

In some embodiments, one or more parameters to describe transition lines may also be used to describe the left or right embrasure.

It is an advantage that the parameters are not abstract numbers, but are linked with visual aspects of the tooth (and thus with a smile).

In an embodiment, the shape or perceived shape of central incisors is characterised by only 8 to 12 parameters, or by 9 to 11 parameters, for example by 10 parameters.

In an embodiment, the shape or perceived shape of lateral incisors is characterised by only 8 to 12 parameters, or by 9 to 11 parameters, for example by 10 parameters.

In an embodiment, the shape or perceived shape of canines is characterised by only 5 to 9 parameters, or by 6 to 8 parameters, for example by 7 parameters.

In an embodiment, the shape or perceived shape of premolars is characterised by only 4 to 8 parameters, or by 5 to 7 parameters, for example by 6 parameters.

In an embodiment, the tooth is characterised by analysing a 2D image or a 2D scan comprising a representation of said tooth in its environment.

In an embodiment, the tooth is characterised by analysing a 3D image or a 3D scan comprising a representation of said tooth in its environment.

In an embodiment, searching and retrieving a limited number of candidate matching teeth for a tooth in the oral space comprises: calculating a matching score based on the limited set of parameters of the tooth in the oral space as a first limited set, and obtaining a second limited set of parameters of a candidate matching tooth from the database, based on differences or deviations between corresponding parameters from the first limited set and the second limited set.

According to a second aspect, the present invention also provides a computer program product containing executable instructions which perform a method according to the first aspect, when being executed on a computer device having or being connected to a display, and having or being connected to a pointing device, and optionally to a digital camera (e.g. via a USB connection), and optionally to a 3D printer.

According to a third aspect, the present invention also provides a method of dental treatment of a patient, comprising the steps of: generating a digital dental design of the oral space using a method according to the first aspect, or using a computer program product according to the second aspect; producing at least one physical object (e.g. a crown, a bridge, an abutment, an implant, a veneer) based on said dental design; and mounting the physical object in an oral space of the patient. (e.g. by bonding or gluing said physical object to one or more existing teeth of the person).

In an embodiment, the method further comprises: capturing a 2D picture of a smile or an oral space of a patient.

According to another aspect, the present invention also provides a storage medium comprising a file containing executable instructions which perform a method according to claim 1, when being executed on a computer device having or being connected to a display, and having or being connected to a pointing device.

According to another aspect, the present invention also provides a computer arrangement comprising: a computer device comprising at least one processor and a memory, the memory comprising an executable file; a display connectable to, or connected to, or embedded in said computer device, and configured for displaying said 2D image; a pointing device connectable to, or connected to, or embedded in said computer device, and configured for receiving user input; wherein the executable file contains executable instructions which perform the method of claim 1, when being executed by said at least one processor.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 11 is a flow chart of an exemplary computer implemented method for building a digital database or digital library of teeth, according to an embodiment of the present invention.

FIG. 16(a) shows a 2D picture or a 2D scan of a patient before dental treatment, and FIG. 16(b) shows a clinical realistic and photo-realistic 2D picture of how that patient will look like after dental treatment.

FIG. 16(c) and FIG. 16(d) are line drawings for FIG. 16(a) and FIG. 16(b).

FIG. 17(a) and FIG. 17(c) show a 2D picture of the teeth shown in FIG. 2(a), overlaid with a grid, as can be used in embodiments of the present invention.

FIG. 17(b) shows a photo-realistic picture of how the patient will look like after dental treatment.

FIG. 18(a) to (c) are line drawings for FIG. 17(a) to (c).

FIG. 19(a) and FIG. 19(c) and FIG. 19(e) are different representations of a first picture. FIG. 19(b) and FIG. 19(d) and FIG. 19(f) are different representations of a second picture.

Figure 1:
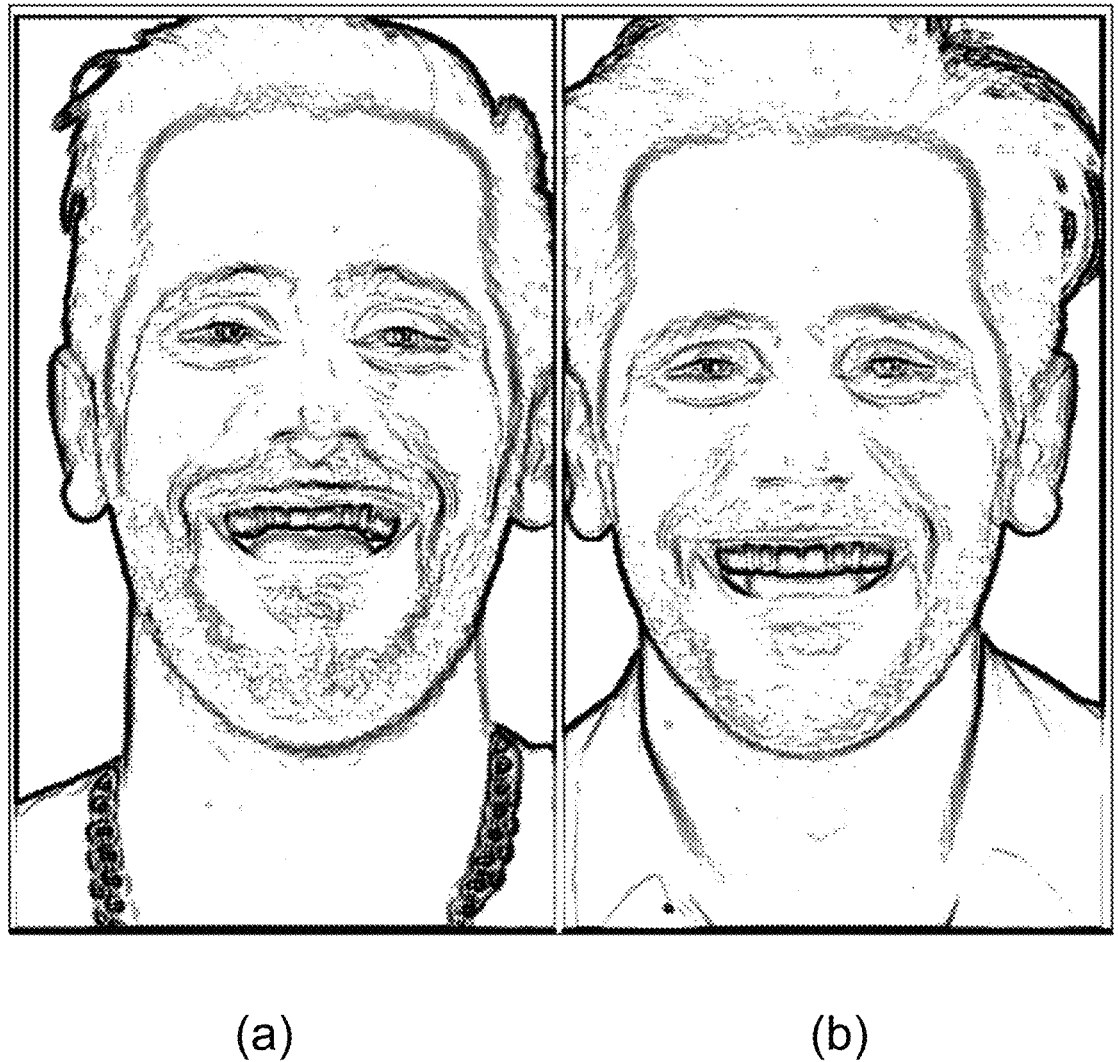
FIG. 1 shows an example of a person before dental restoration (FIG. 1a), and after dental restoration (FIG. 1b). The restorated teeth are longer than the original teeth.
Figure 2:
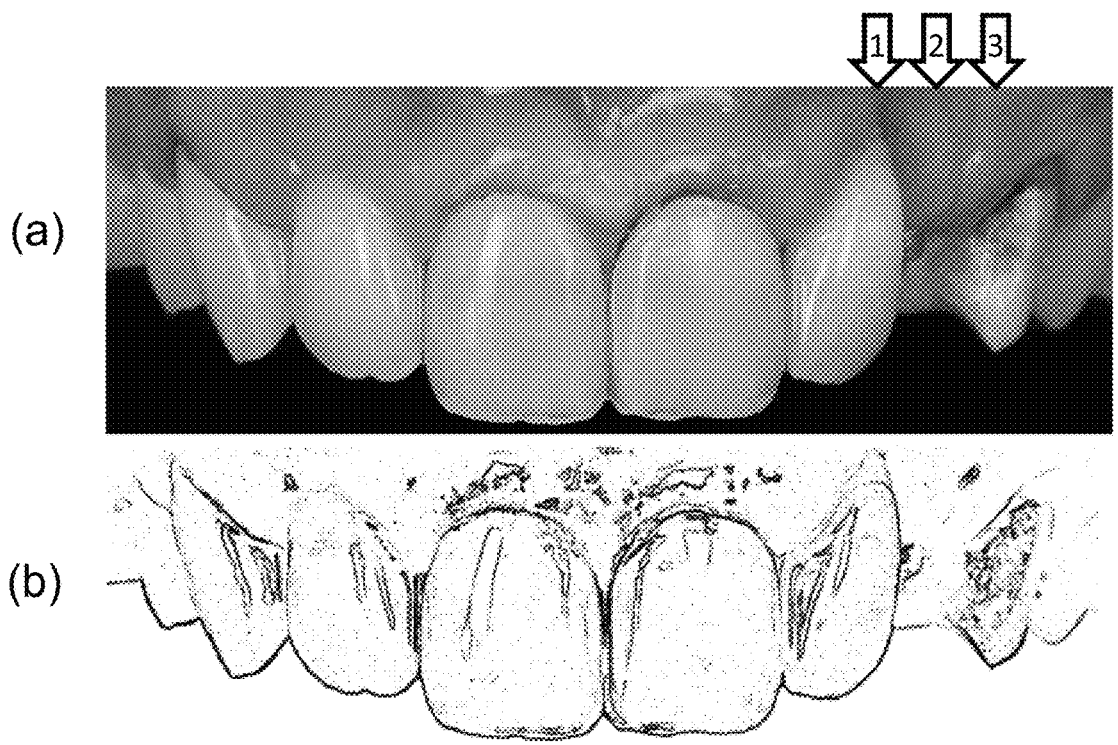
FIG. 2 shows an example of an upper jaw of a person (with a missing tooth) before dental restoration (FIG. 2a and FIG. 2b). This smile is generally considered to be not beautiful.
Figure 3:
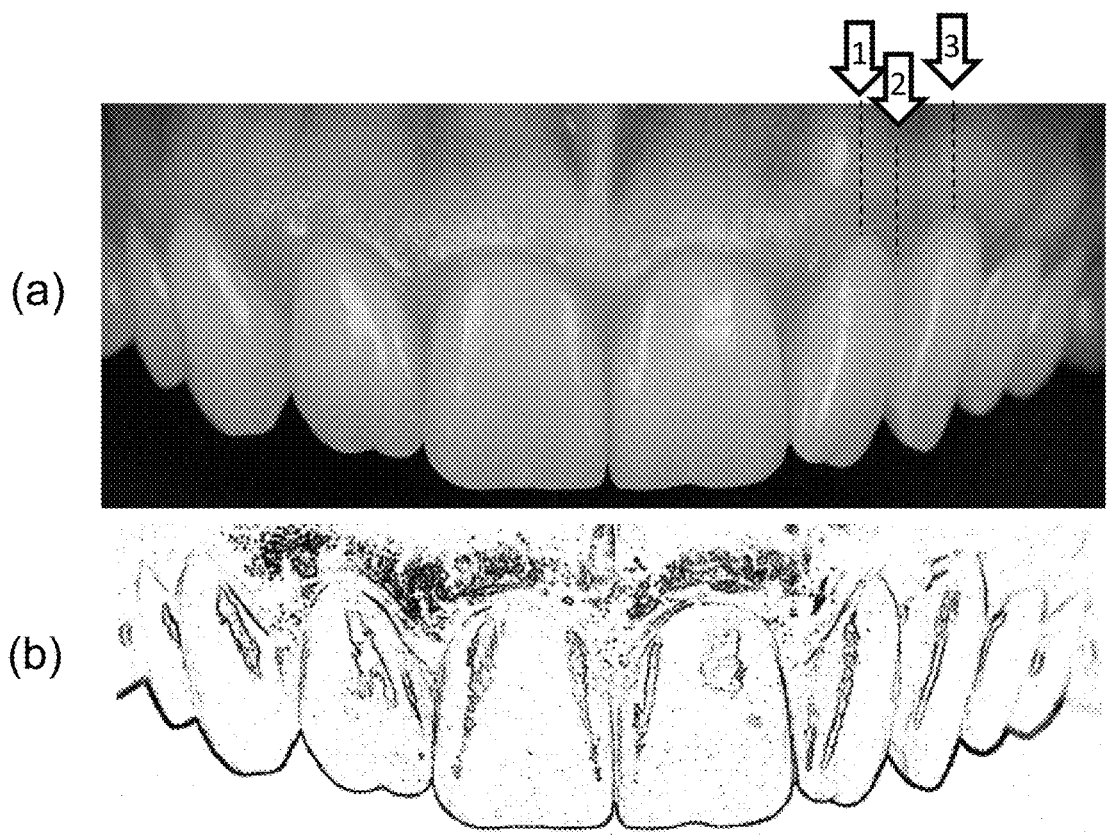
FIG. 3 shows the upper jaw of the same person of FIG. 2 after dental restoration and after surgery. This smile is generally considered to be beautiful.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the terms "digital database" and "digital library" are used as synonyms.

In this document, the terms "future teeth" or "desired teeth" or "designed teeth" or "newly defined teeth" or "envisioned teeth" or "target teeth" or the like, mean the same. In the context of the present invention, such expressions may refer to a set of parameters, e.g. a set of points characterising an envisioned tooth, or to a 2D bitmap representation of a tooth found in a digital library corresponding to this set of parameters or points, or to a corresponding physical object (e.g. a veneer), depending on the context.

In this document, the term "transition lines" (of a tooth)" may refer to the upright, e.g. vertical transition from the labial surface of an anterior tooth to the interproximal surface, and may in this document also be referred to by "line angles" or by "reflection lines". Likewise the terms "transition curves" or "reflection curves" refers to such transition which is not linear.

In this document, the "upper teeth" refers to the teeth of the upper jaw, and the "lower teeth" refers to the teeth of the lower jaw of a person.

The "upper curve of the upper teeth" or the "upper curve of the teeth of the upper jaw" is situated near the zenith of these teeth.

The "upper curve of the lower teeth" or the "upper curve of the teeth of the lower jaw" is situated near the incisal edge of these teeth.

The "lower curve of the upper teeth" or the "lower curve of the teeth of the upper jaw" is situated near the incisal edge of these teeth.

The "lower curve of the lower teeth" or the "lower curve of the teeth of the lower jaw" is situated near the zenith of these teeth.

When reference is made to "the lower curve" without specifying which jaw, usually the lower curve of the upper teeth is referred to, unless clear from the context that something else was meant.

The expression "dragging a mouse" means "pressing a button of the mouse device and moving the mouse device while holding the button in a pressed position".

In this document, the term "smile" and "oral space" are used as synonyms, unless clear from the context that something else is meant. The term "smile" may be preferred for example when referring to a frontal image from the outside. The term "oral space" may be preferred for example when referring to adjacent teeth, or to the papilla near a tooth.

The present invention relates in general to methods and techniques and tools, e.g. computer aided techniques and tools for dental restoration, such as for example crowns, bridges, abutments, implants, or veneers. The present invention relates in particular to computer implemented methods, and/or computer programs and/or software modules to perform one or more of the following:

- to automatically characterize a tooth in its environment, e.g. to characterize a shape and size of a tooth of a patient in an intraoral space, e.g. by means of a limited set of parameters, e.g. by means of a relatively small set of points (e.g. at most 20 points) in a 2D or 3D image,
- to allow a user (e.g. a dentist) to adjust one or more of these characteristics in a simple and efficient manner, e.g. by allowing the user to change one or more of these parameters, e.g. by shifting points in a 2D or 3D image, thereby specifying or defining characteristics of the future teeth (e.g. dentally restored teeth),
- to build a digital database of teeth (e.g. of natural teeth), which database is searchable in a fast and efficient manner,
- to determine a matching score between two teeth, for example an existing tooth in an intraoral space of a patient (on the one hand) and a virtual tooth in a digital database (on the other hand),
- to find a limited number (e.g. at most ten or at most five or at most three) virtual teeth in a digital database having a good match with a particular tooth of a patient, e.g. having a matching score higher than a predetermined value (e.g. higher than 85%, or higher than 90%, or higher than 95%), preferably in a fast and efficient manner,
- to provide a clinically realistic (e.g. what is clinically possible) and a photo-realistic (e.g. not robotic or cartoon-like) 2D picture or 2D image of how a face (or a portion thereof, in particular a smile) of a particular patient will look like after dental treatment, for example (but not limited) to cases where the gingiva will be cut,
- to define and/or generate a 3D-digital representation of one or more dental restorations for a patient, for manufacturing said dental restoration,
- to actually create a 3D physical object for dental restoration, e.g. a veneer or a crown or the like,
- and/or combinations hereof.

The inventors of the present invention have many years of experience as dentists, in particular for improving or restoring a "smile" of a patient, an example of which is shown in FIG. 1(a) and FIG. 1(b).

FIG. 1(a) shows a picture of a person having relatively short teeth. FIG. 1(b) shows the same person after dental treatment, which in this particular case was a purely cosmetic treatment without surgery. Traditionally, such a treatment typically involves several steps, including:
 a) the design of artificial teeth or artificial teeth portions having a suitable size and shape,
 b) making or producing physical objects, e.g. veneers of about 1 mm thickness, comprising or consisting of ceramics or composite materials, e.g. by 3D printing,
 c) applying, e.g. bonding or gluing said physical objects to the existing teeth of the person.

This is known for many years, and as stated for example in the background section of US patent application US2013/0060532, can be partially supported by CAD programs, in particular step a).

While such CAD programs are very useful, some problems or challenges remain, and other problems arise.
 (i) For example, a very important aspect when designing "a smile" is that the end result has to be visually attractive or beautiful or aesthetic. In fact, this is often the only reason why patients start the treatment, but CAD programs or computers in general are not aware of "beauty", and for inter alia this reason, there is a common believe that the choice of how the future teeth should look like, is purely subjective. Some CAD programs therefore allow the user (e.g. the dentist and/or the patient) to select a "nice looking" tooth from a catalogue of digital teeth, which is difficult enough to select from, and moreover, the dentist or patient then has to modify the shape and/or size to make it fit between the other teeth. This process is very time consuming. In fact, the inventors have discovered that there is a first group of dentists who spend a relatively long time (e.g. typically at least 20 minutes) searching in the digital database for a nice tooth, and subsequently spend typically at least another 20 minutes for adjusting the selected tooth to make it fit; and that there is a second group of dentists who always use the same four or five teeth from the entire database, and typically spend at least 30 minutes adjusting them, trying to make them fit, and trying to provide an overall aesthetic smile.
 (ii) Another shortcoming that some existing CAD programs have, is that they do not show a photo-realistic picture of how the person will look like after dental treatment, but instead provide a rather robotic or cartoon-like picture. This is especially true for CAD programs based on 3D models. Many patients do not like such result, and do not proceed with the treatment, which is a pity, because the robotic pictures are not what they will really look like after treatment.
 (iii) A particular insight that the inventors have learned over the years is that some existing CAD programs do provide a photo-realistic image of the patient after the envisioned treatment, but the image did not always correspond with reality.

Confronted with these technical shortcomings while being passionate about natural beauty, and desiring to help patients who are unhappy with their current dental situation, e.g. with their smile, the inventors came to the insights and ideas and solutions described below, constituting the present invention.

Before describing the proposed solution(s), one of the insights underlying the present invention will be explained with reference to FIG. 2(a) to FIG. 3(b).

FIG. 2(a) and FIG. 2(b) show a grayscale image and a line drawing of an example of an upper jaw of a person having a missing tooth (indicated by arrow 2) and a recess in the gingiva above the left lateral incisor (indicated by arrow 1). Not surprisingly, this person was not happy with her current set of teeth.

FIG. 3(a) and FIG. 3(b) show a grayscale image and a line drawing of the upper jaw of the same person of FIG. 2(a) after surgery (wherein e.g. tissue was added at the location indicated by arrow 1) and after dental treatment (with e.g. a dental implant at the location of arrow 2, and a plurality of veneers bonded to the other teeth visible in FIG. 3(a).

Figure 6:
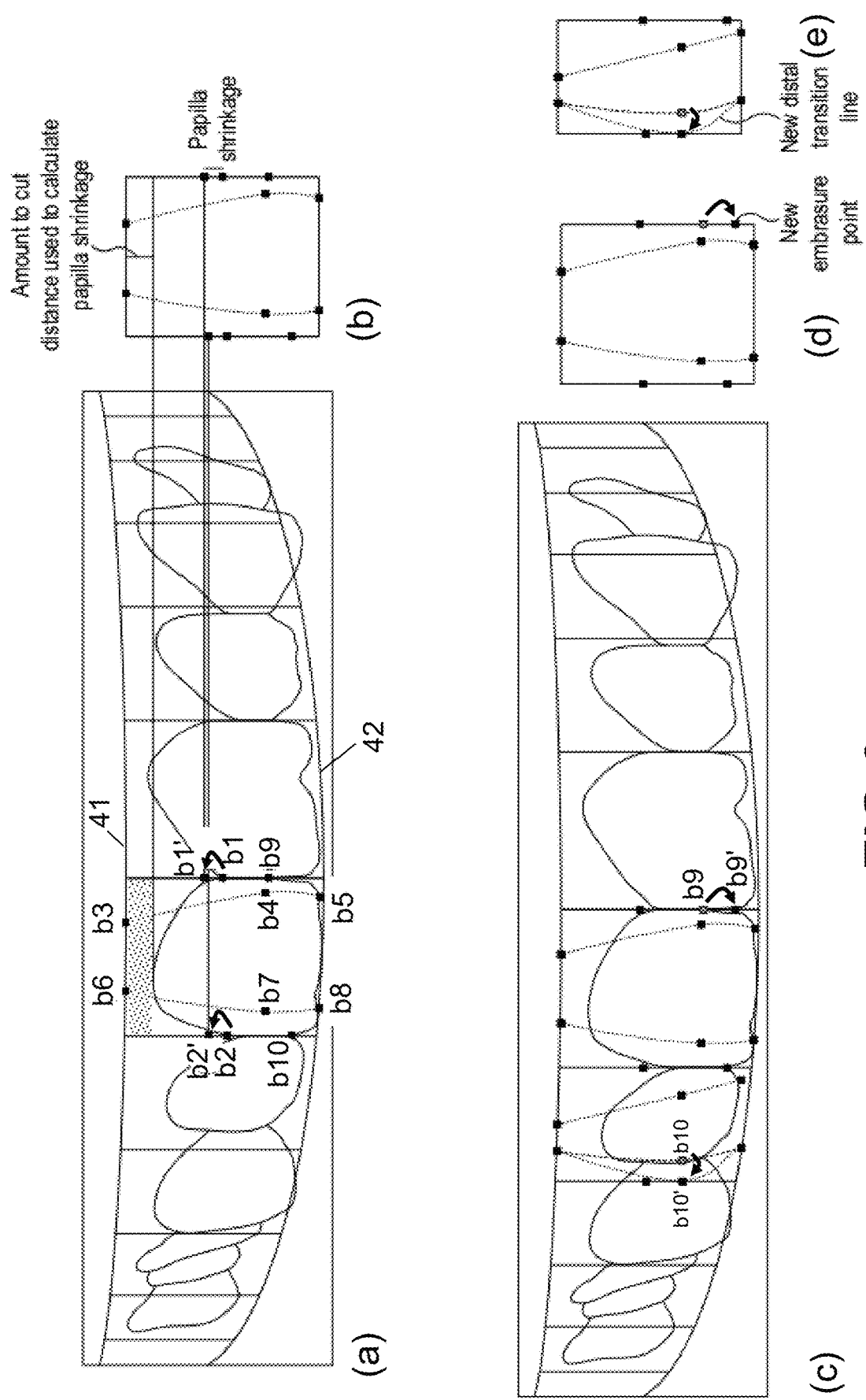
FIGS. 6(a) and (b) illustrate an important insight underlying some of the principles of the present invention.
FIGS. 6(c) to (e) illustrate how future (or envisioned teeth) can easily and rapidly be designed or defined by merely shifting one or more of the characteristic points of the existing teeth.

Two of the insights which the dentists had gained before this treatment was performed, and which was taken into account when "designing" the future teeth of this person, or rather when "defining" the future teeth of this person, (which difference will become clear further), are:

i) that it is possible to add tissue (e.g. by transplantation) to the gingiva above a central line of a tooth (e.g. at arrow number 1), but it is not (normally) possible to add tissue to the papilla (e.g. at arrow number 2); and ii) that, in cases where the gingiva is cut (e.g. as shown in FIG. 6(a)), the papilla will slightly shrink.

As far as is known to the inventors, these insights are not known in the art, but experience has learned that these are very important when designing or defining new teeth of certain patients (where tissue is to be added or removed), e.g. because otherwise a gap or opening will occur between the new teeth, below the shrunk papilla.

It is pointed out that, even though these insights were mainly gained from treatments involving surgery, the solutions presented herein, in the form of computer-implemented methods or computer programs or a searchable database, do not involve surgery, and hence constitute patentable subject matter.

Likewise, even though an ultimate goal of the dentists is to create a beautiful smile for the patient, the invention is not directed to an aesthetic creation per se, but provides technical solutions to technical problems, and thus constitutes patentable subject matter, even if the solution is also beautiful.

FIG. 4(a) to (h) show several (preparatory) steps which can be used in embodiments of the present invention, for obtaining an image (e.g. a normalized 2D image) of an intraoral space as digital input for further processing, e.g. for designing or defining or planning a dental restoration.

FIG. 4(a) shows an exemplary 2D image of a smiling person, for example a portrait image captured by a digital image camera.

FIG. 4(b) shows a subpicture of FIG. 4(a) after identifying a face midline, after cropping the picture and after rotating the face. This can be done for example using two reference points on the face, e.g. the philtrum and the glabella, or the eye centres, or in another suitable way.

FIG. 4(c) shows how the inner contours of the lips can be defined (e.g. by allowing a user to manually indicate a plurality of points by clicking a mouse), or automatically detected, for example using edge detection techniques, or a combination hereof. The lip contours define an area (e.g. the shaded area in FIG. 4(c)) which will be updated or partially updated with a visualisation of one or more future teeth (see e.g. FIG. 4(g) or FIG. 15(b) or FIG. 16(b) or FIG. 17(b)).

FIG. 4(d) shows the picture of FIG. 4(b), but wherein the intraoral area indicated in FIG. 4(c) is or can be partially overlaid with one or more future teeth, as will be explained next.

FIG. 4(e) is an enlarged view of the shaded area shown in FIG. 4(c), showing a 2D image of the current clinical situation and an additional grid overlaid over the 2D-image. The grid comprises an upper curve 41 and a lower curve 42 and a plurality of vertical line segments. The upper curve 41 can be used to indicate a (current or future) transition between upper ends of at least some of the teeth and the (current or future) gingiva. The lower curve 42 can be used to indicate a lower end of at least some of the teeth (e.g. the incisal end of some of the upper teeth). The vertical line segments can be used to define substantially rectangular areas or rectangular areas (see e.g. FIG. 5(b) and FIG. 17(a)) comprising individual teeth. The picture of FIG. 4(e) is also referred to herein as the "restorative space".

FIG. 4(f) shows an example of how the picture of FIG. 4(e) can be normalized or calibrated, for example based on a distance (in the example 17.3 mm) between incisal embrasures between canines and first premolars, but another distance may also be used. This distance can for example be measured in the mouth using a vernier gauge or a caliper, or can be measured on a gypsum model, or extracted from a 3D STL file, or determined in any other way.

FIG. 4(g) and FIG. 4(h) are similar to FIG. 4(d) and FIG. 4(e), but indicate that a user (e.g. a dentist or the patient) can change the position of the upper curve 41 and/or the lower curve 42, to thereby define (e.g. increase or decrease) the height (e.g. the desired height) of the future teeth, for example by dragging some reference points of the curves (e.g. as indicated with circles or squares).

In preferred embodiments of the present invention, the database contains a plurality of photorealistic 2D pictures of teeth, each with a portion of gingival tissue (at the top) and a portion of papilla tissue (at the sides) and with some amount of shadow (at the bottom). Preferably the visualisation of the future dental situation of FIG. 4(g) may include overlaying a portion of the picture of FIG. 4(b), e.g. a portion of the area indicated in FIG. 4(c), using one or more pictures from the database, for example using semi-transparency for pixels comprising tissue information and/or shadow information, and non-transparency for pixels comprising dental information. When actually designing or defining the future smile, the picture of FIG. 4(h) may further include an overlay of one or more 2D contours of the one or more teeth selected from the library (e.g. as shown in FIG. 7(e) or FIG. 15(b) or FIG. 17(c)).

In preferred embodiments of the present invention, the picture of FIG. 4(g) and FIG. 4(h) are simultaneously shown on a display, and are synchronously updated for each modification made (as will be explained further), for example when replacing one of the existing teeth by a larger tooth from the library. The picture of FIG. 4(h) may display the original tooth and a contour of the new tooth, while the picture of FIG. 4(g) may display a photo-realistic 2D image of the new tooth from the library combined with the original picture, for example using semi-transparency.

In embodiments of the present invention, a user interface (e.g. a graphical user interface) may comprise an area like the one shown in FIG. 4(h) functioning as the "working area", and also an area like the one shown in FIG. 4(g) where a photo-realistic image is displayed which can be considered as the "result area". An example of such a user-interface is shown in FIGS. 17(b) and (c).

As described above, existing CAD tools typically use 3D models of an entire set of teeth of a person, where an outer surface of a tooth is typically described or defined by a huge number of "finite elements". An advantage of such representation is that it allows (a computer) to accurately describe very complex 3D shapes, but a disadvantage (for human users) is that modifying such a model to meet future teeth requirements (e.g. an envisioned length), moreover in a manner in which the result remains beautiful (as a constraint), is very difficult and very time consuming, and may require training. That is probably why several dentists always use the same four or five model teeth over and over again.

The inventors of the present invention took a radically different approach, and asked themselves "what is the point of building or designing artificial 3D teeth models when nature already provides us with thousands of millions (e.g. about $6 \times 10^9$) samples of teeth, at least 30% of which are beautiful. The inventors wondered if it would be technically possible to make use of what nature has already "designed", to "digitize and store" a subset of that information in a database, and to "select" suitable teeth from that database when generating a dental design and/or planning a dental restoration. They envisioned that, if the database is sufficiently large, no modification whatsoever would be required, and "design could be replaced by selection". They realised that, while the database is not yet sufficiently large, or for other practical reasons (e.g. storage capacity), it would be good to allow some simple modifications or adjustments (such as scaling). The biggest problem of this idea is "how to find a good matching tooth from the database, in an efficient manner".

As far as is known to the inventors, current CAD-tools do not address this problem. In particular, they do not allow to search a database of digital teeth to find a good match for an existing tooth of a patient, at least not in a highly efficient manner, but instead present the user (e.g. the dentist or patient) with a catalogue of teeth, (typically comprising for example 50 to 100 sets of 10 to 12 types of teeth), from which the user can select one, for example one that subjectively looks beautiful, but then the user still needs to adjust the shape and/or size of the tooth, to make it match the clinical situation.

Confronted with these challenges, the inventors came to the idea of providing a computer implemented method of characterising a tooth by analysing at least one digital representation of said tooth in its clinical environment, the method comprising the steps of:
  a) determining a parameter indicative for a position of the tooth in a mouth, for example an FDI-number, or a number according to another system, e.g. according to the American tooth numbering system; and
  b) determining a limited set of parameters (e.g. only about 8 to 12, e.g. about 10 parameters for central incisors and for lateral incisors; only about 5 to 9, e.g. about 7 parameters for canines; and only about 5 to 7, e.g. about 6 parameters for premolars) for describing the tooth in its clinical environment (e.g. with respect to the gingiva at the top of the tooth, and with respect to the papilla's on the left and the right of the tooth).

The limited set of parameters comprises at least two parameter for describing a size of said tooth, for example a height H and a width W (see e.g. FIG. 5(b)), or a height H and a proportion, or a width W and a proportion, where proportion is defined as width divided by height; and at least one parameter for describing a first papilla height (see for example point a1 in FIG. 5(a)), and at least one parameter for describing a second papilla height (see for example point a2 in FIG. 5(a)).

Experiments have shown that surprisingly good results (e.g. in terms of processing speed, and in terms of physically matching or resembling) can be obtained even when using only a very limited set of parameters (e.g. only a relatively small number of characteristic points, e.g. at most 20 points), as opposed to the huge number of points typically used in 3D models based on "finite elements".

It is explicitly pointed out that, preferably, not only characteristics of the tooth itself are taken into account, but also characteristics of tissue in direct contact with the tooth, in particular the papilla's on both sides of the tooth. As described above, it can be avoided that an opening will occur after dental treatment, which would not only negatively influence the beauty of the dental restoration, but would also create a cavity which may be a cause for increased tooth decay.

The limited set of parameters are the clue that enable a database of teeth to be searchable, and as will be described further, also allow a "matching score" to be determined, and also allow software tools to automatically provide a limited set of (candidate) matching teeth, thereby removing a huge burden from the users (e.g. dentists or patients). In addition, this concept also allows the user to adjust the shape and/or size of the future teeth in a very simple manner (e.g. by simply dragging or moving points in a picture). In addition, in case the database also contains 2D pictures, and because the searching in the database is so fast, the software can almost instantly show the results of the adjustments by means of a photo-realistic image. These are the main underlying ideas of the present invention.

It is noted that this solution goes directly against the common believe that the selection of future teeth is purely subjective. Firstly because the characteristic points can be automatically determined, and secondly, because the "best matching tooth" from the database can be automatically found, according to a predefined matching criterion. This is unprecedented. In preferred embodiments of the present invention, however, the user has some freedom of choice (e.g. when defining the future length of the teeth), as will be explained further, but once this choice is made, a computer can almost immediately search another best matching tooth (or a limited number of best matching teeth), and can almost immediately visualize how the person will look like after dental treatment. This will be described in more detail in FIG. 14.

In case the parameters are points or positions in a 2D image, each parameter may for example comprise two coordinates (e.g. an X and a Y-coordinate). In case the parameters are positions in a 3D space, each parameter may comprise three coordinates (e.g. an X, Y and Z-coordinate).

The at least two parameters for describing a size of the tooth may be a Height [e.g. in mm] and a Width [e.g. in mm]; or a Height [e.g. in mm] and a Proportion [as a %]; or a Width [in mm] and a Proportion [as a %], where proportion is defined as Width/Height.

The digital representation of the "tooth in its direct environment" may be any suitable digital representation in 2D or 3D, for example a 2D facial picture, or a 3D facial scan, or a 3D intraoral scan, or a frame of a digital 2D movie, or a frame of a digital 3D movie, or a stereoscopic picture, etc.

In embodiments of the present invention, at least some of the parameters or points or positions are not expressed as absolute values [in mm], but as relative values [e.g. as percentages], for example relative to a rectangle substantially surrounding the currently existing tooth (before dental treatment) or the envisioned future tooth (after dental treatment). An example of such a rectangle is shown for example in FIG. 5(b).

In preferred embodiments, the tooth may be characterised by two or four additional parameters for describing a first and a second embrasure, see e.g. points a8 and a5 of FIG. 5(a), or points a8, a5, a9 and a10 of FIG. 5(a).

The inventors also surprisingly found that the overall shape of the tooth can be described in a highly efficient manner by means of only a few well chosen parameters. In some embodiments based mainly on 2D pictures, the 3D-shape of the tooth can be efficiently described by means of "transition lines" or "transition curves", also referred to herein as "reflection lines" or "reflection curves". Moreover, as will be described further, such lines or curves can be efficiently described by means of only four or only 6 parameters with surprisingly good results. As far as is known to the inventors, this technique is not known in the art. In contrast, what is known, is the use of a single central line (known as "tooth axis"), but experiments have shown that using two lines or curves, especially for the central incisors and the lateral incisors, moreover coded by means of only four or only six points, leads to amazingly good results, while keeping computational efforts low. This is another underlying idea of at least some embodiments of the present invention.

The present invention will now be described in further detail, by way of examples, and with reference to FIG. 5(a) to FIG. 18(c).

FIG. 5(a) to (f) shows three examples of how a central incisor can be characterised by means of 10 points a1 to a10. In the three examples, the height H and the width W (see FIG. 5(b)) of the central incisor is the same, but the papilla heights and the shape of the three exemplary teeth (of FIGS. 5(a), 5(c- and 5(e)) are different.

As shown, a rectangle is drawn, the edges of which are tangential to a contour of the tooth.

The point a1 located on a first vertical edge of the rectangle indicates a first papilla height.

The point a2 located on a second vertical edge of the rectangle indicates a second papilla height.

The points a3, a4 and a5 specify the location of a first transition curve. The point a3 is located on an upper side of the rectangle. The point a5 is located on a lower side of the rectangle. The point a4 is located inside the rectangular area, and its preferably chosen such that the shape of a curve, e.g. a spline or a polynomial or another parametric curve through the points a3, a4 and a5 corresponds relatively well with the actual transition line of the existing tooth as can be seen in the 2D facial picture. In the examples shown in FIG. 5(a) to (f), the point a4 is chosen at a predefined distance (d) equal to about 30% of the height H of the tooth, measured from the bottom side of the rectangle, or 70% of the height H of the tooth measured from the top, but of course the present invention is not limited thereto, and another distance "d" can also be used.

Likewise, the points a6, a7 and a8 specify or indicate the location of a second transition line of the tooth.

Points a6 and a3 indicate the intersection of the transition curves and the upper edge of the rectangle.

Likewise the points a8 and a5 indicate the intersection of the transition curves and the lower edge of the rectangle.

The points a9 and a10, located on the vertical edges of the rectangle, determine the embrasures of the tooth.

Experiments have shown that by using this limited set of only ten points, the shape and size of the central incisor can actually be very well defined. It should come as a surprise to the reader that the tooth actually being a 3D object can be very well characterised by these ten points in a 2D-picture. It is further noted that these points are not merely "abstract points" in a picture, but correspond to real physical locations on a real tooth of a real person, and these points are strategically chosen (except maybe for the points a4 and a7 which could also be chosen slightly higher or lower).

In alternative embodiments, the points a9 and a10 could be omitted from the set, and predefined values for the embrasures could be used instead.

As already suggested above, the position of the points a1 to a10 can be uniquely defined by means of ten numerical values, for example percentages or floating point values or integer values. For example, a value of 20% may be assigned to the parameter a6, meaning that the point a6 is located at a distance x=20% of W from the left edge of the rectangle. Likewise, the other points can also be represented by percentage values relative to the edges of the surrounding rectangle. The position of the tooth in the mouth can be represented for example by an FDI-number, e.g. number in the range from 11 to 48, or a number in the range from 11 to 85 (if baby teeth are also considered). Finally, if two additional numbers, for example H (height) and W (width) are added, or W (width) and P (proportion=W/H), it can be seen that the central incisors can be represented by a limited set of only 13 numerical values.

In fact, for the central incisors, one additional parameter may be added, to indicate whether the tooth is rather "square", or "triangular" or "circular", resulting in a limited set of only 14 parameters.

These 14 parameters may be determined fully automatically using image processing techniques. It is pointed out that a computer implemented method for automatic detection of these characteristic points is not a "mere automation", but has to be recognized as a technical solution to a technical problem of how to efficiently describe the shape and size of a tooth in its clinical environment, because the technique described above is not known in the art.

In an alternative embodiment, the surrounding rectangle is replaced by a virtual beam shaped object having planes tangential to the tooth (except for the upper plane which can for example be chosen as the highest visible point of the tooth, at an edge of the gingiva), and the points a1 to a10 may be defined with reference to the edges and/or corners and/or planes of this beam shape. Other alternatives are of course also possible.

FIGS. 5(c) and (d) show a second exemplary tooth and its characteristic points on a 2D image.

FIGS. 5(e) and (f) show a third exemplary tooth and its characteristic points on a 2D image.

FIGS. 5(a) to (f) show how central incisors can be characterised by means of a limited set of parameters, e.g. a limited set of less than 20 numerical values, or less than 15 numerical values, for example by means of only 14 numerical values. In a similar manner, also other teeth can be represented by a limited set of less than 15 numerical values. For example, the shape of lateral incisors may be characterised by 10 points (or parameters): including 2 points for papilla's, 3+2=5 points for defining one transition curve and one transition line, and 4 points for embrasures, but preferably one point is commonly used for a transition line and for an embrasure, hence 11−1=10 points in total;

and the shape of canines may be characterised by 7 points (or parameters), because only one transition line is visible from the front, hence 2 points for one transition line, 2 points for papilla's, and 3 points for embrasures (only 1 point for incisal edge), hence 2+2+3=7 points in total;

and the shape of premolars may be characterised by 6 points (or parameters), because only one transition line is visible from the front, hence 2 points for one transition line, 2 points for papilla's, and 3 points for embrasures, but preferably one point is commonly used for a transition line and the mesial embrasure point (the one towards the canine), hence 2+2+3−1=6 points in total.

But of course, the present invention is not limited to these specific points or parameters, and other points or parameters may also be used.

It may seem that these numerical values are insufficient to actually produce a 3D physical object (e.g. implant) of a central incisor, but that is not required, because in preferred embodiments of the present invention, the database not only comprises a 2D image of the teeth, but also a corresponding 3D-model, and once a matching tooth is found based on a matching 2D-image, or rather, based on the limited set of characterizing points of that 2D-image, then the 3D-model can be used for actual production.

In other words, the limited set of parameters described above are sufficient to define a matching tooth for the specific (current or future) clinical environment, and thereby result in a good looking new smile of a patient. It is noted in this respect that the smile of a patient is primarily determined by the "frontal appearance" of the upper teeth.

Thus, in preferred embodiments of the present invention, not only a 2D-image or 2D-scan is made of healthy teeth stored in the database, but preferably also a 3D scan is made of healthy teeth, (each tooth may be separated from the 3D scan, and prepared by filling the interdental part), and stored in the digital database, along with a 2D image and along with the limited set of parameters, to give the best of both worlds:

the 2D image and the limited set of parameters allow to search the database in a very efficient way, and allows to show the patient a photo-realistic image of how the dental restoration will look like after dental treatment. Thanks to this efficient search, the process of generating a dental design by moving the position of the characteristic points and/or moving the position of the upper or lower curve, thereby modifying the search parameters for a plurality of teeth, yields almost instantaneous results; and the 3D scan allows to actually produce a 3D object of the virtual tooth found in the library once the user (e.g. patient and/or dentist) has made a final selection.

Or stated in other words, the 2D image and the limited set of parameters can be used when defining the future teeth, while the 3D representation can be used thereafter to actually produce physical objects, e.g. veneers.

For completeness, it is noted that an intraoral 3D scan, and separated teeth from an intraoral 3D scan, and production of 3D objects based on such 3D scans are known in the art, and they can advantageously be used in combination with the techniques described above.

FIGS. 6(a) and (b) illustrate how a user (e.g. a dentist) can (and should) take into account papilla shrinkage when defining the characteristics of the future teeth, as part of a medical treatment which also involves cutting the gingiva. Reasons for cutting the gingiva are not relevant for the present invention, but if the gingiva will be cut, the papilla will shrink, and this should be taken into account in the design of the future teeth.

FIG. 6(a) shows the restorative space (as in FIG. 4h), where the user can shift the upper curve 41 to indicate how far the gingiva will be cut. The points b1 and b2 indicate the current papilla heights, but when planning to cut the gingiva, the points b1 and b2 need to be shifted upwards towards the positions b1' and b2'. This shift may be performed manually or automatically when shifting the upper curve 41. In order to provide a clinically realistic picture of how the patient will look like after the treatment, this papilla shrinkage has to be taken into account, and the future teeth should be defined already taking into account this shrinkage even before it has happened.

FIGS. 6(c) and (d) and (e) show examples of other modifications that may be defined by a user (e.g. the dentist or the patient), by merely shifting one or more of the characteristic points in the restorative space image. In the example of FIG. 6(d), the size of one of the embrasures is reduced (by shifting the point b9 downwards). In the example of FIG. 6(e) the shape of the lateral incisor is adjusted by shifting the point b7 outwardly, thereby actually bending the distal transition curve.

FIGS. 7(a) to (g) illustrate how, based upon a limited set of parameters, one or more or a limited number of matching teeth can automatically be found in a digital library of teeth.

FIG. 7(a) shows an example of a limited set of parameters that specify a shape and size of an envisioned or future tooth (in the example a central incisor). As explained above, the limited set of parameters may for example comprise (6 to 10)+3=9 to 13 numerical values (e.g. 6 to 10 percentage values corresponding to positions of characteristic points on a normalized rectangle or beam shape+an FDI number+a width W [e.g. in mm]+a proportion value (e.g. proportion=W/H=75%). For ease of the description, in most drawings, only a rectangle with the 10 points is shown.

The limited set of parameters or the points of FIG. 7(a) can be seen as "input" for a computer program that has to find a limited number of "matching teeth" in a digital database. In fact, for cases where the user (e.g. dentist) does not want or does not need to change the points, but only wants to find and/or produce a "new tooth" or a "new veneer" having the same size and shape as the existing tooth (e.g. because the existing tooth is broken), the picture or subpicture or scan could be submitted to the computer program as well, and the computer program could determine the position of the points automatically.

Figure 7:
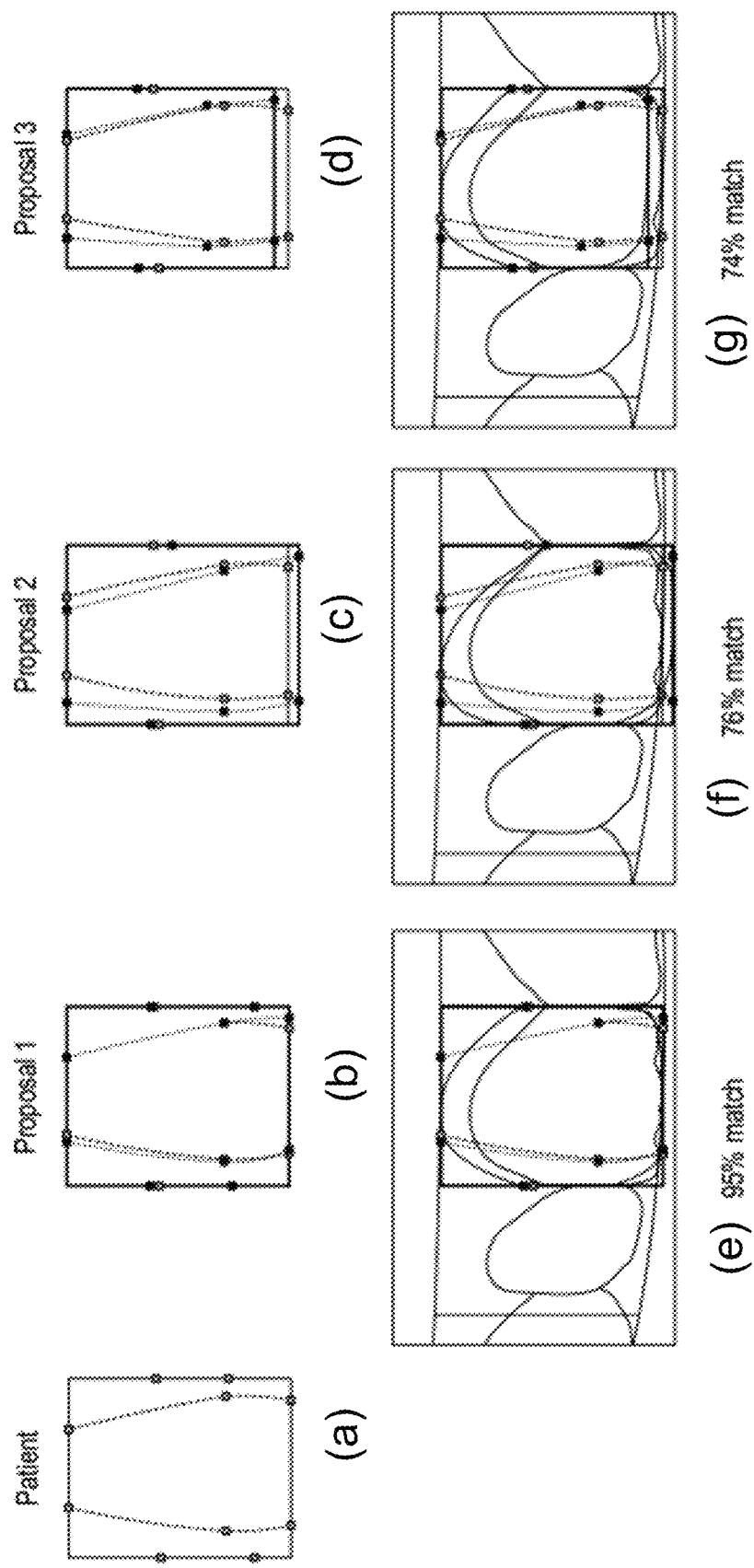
FIGS. 7(a) to (g) illustrate how in embodiments of the present invention, and based upon an image or scan of an existing tooth in its environment (e.g. in the oral cavity), automatically a limited number of matching teeth can be found in a digital library of teeth.

The computer program would then search in the digital database for a limited number (e.g. only one, or only 2, or at most 3, or at most 5, or at most 7) matching teeth, based on the limited set of parameters (e.g. the characteristic values). In the example of FIG. 7, the computer program finds three matching teeth, the characteristic points of which are shown in FIG. 7(b) to FIG. 7(d). The computer program may present these candidate matching teeth (or a contour thereof) to the user, together with a matching score. FIG. 15 shows a possible user-interface for presenting the limited set of candidate matching teeth, but of course, the invention is not limited to this particular user interface. Normally, the computer program would automatically preselect the tooth with the highest matching score, but in embodiments of the present invention the computer program may allow the user to select one of the other candidate teeth (see e.g. optional steps 1405 and 1407 of the method of FIG. 14).

It can be appreciated from FIG. 7(b) to FIG. 7(d) that it is difficult for a human user to decide which of the candidate teeth looks best on the particular person solely based on the position of the points and transition lines or transition curves. Thereto, the computer program preferably shows a contour of the preselected or selected future tooth over the restorative space representation (e.g. as shown in FIG. 4e or FIG. 4h), optionally also with the target or envisioned characteristic points, and optionally also with the characteristic points of the selected candidate tooth, and preferably also with the matching score.

FIG. 7(e) shows a portion of the restorative space in case the candidate future tooth of FIG. 7(b) is selected. FIG. 7(f) shows a portion of the restorative space in case the candidate future tooth of FIG. 7(c) is selected, and FIG. 7(g) shows a portion of the restorative space in case the candidate future tooth of FIG. 7(d) is selected. Typically only one of FIG. 7(e) to FIG. 7(g) would be shown to the user at any moment in time, for example in the manner as shown in FIG. 15(a) to FIG. 15(d), depending on which candidate tooth is selected.

It is noted that in practice a matching score of 74% is not a good match, but these candidate teeth are shown to illustrate how the characteristics of the envisioned (e.g. desired) future tooth may deviate from the characteristics of the candidate matching tooth selected from the database.

While not explicitly shown in FIG. 7, the computer program may be implemented in such a way that the user is allowed to modify the envisioned characteristic points (see e.g. step 1403 and step 1408 of FIG. 14), and in response, the computer program will search the database (see step 1404 of FIG. 14) and present another limited set of best matching teeth from the database. In a prototype of the program, this occurs almost instantaneously (e.g. in less than 0.5 s), thanks to the highly efficient manner of characterizing the tooth, and the ability to search the database for a matching tooth based on these characteristics.

Also, while not shown in FIG. 7(a)-(g), but see for example FIG. 4(g) and FIG. 4(h), or FIG. 17(b) and FIG. 17(c), the computer program may also show a photo-realistic image of the patient with the newly envisioned teeth. In this way, the patient gets an impression of what he or she will look like after dental treatment with this or with these selected and/or modified (e.g. scaled) teeth from the database.

To appreciate the power or the benefit of such a rendering, reference is made to the example of FIG. 15(a) and FIG. 15(b), where the patient can clearly see the current clinical situation before dental treatment (in FIG. 15a) and the future look after dental treatment (in FIG. 15b). If the patient is not happy with the result, he or she can further modify the characteristics of the future teeth, or can cancel the treatment. It is a major advantage of embodiments of the present invention that the patient can see a clinically realistic picture of how he or she will look like after dental treatment, especially in case the gingiva is cut.

FIG. 7 illustrates the situation for a central incisor, but of course, the same principles can also be used for other teeth, in particular the lateral incisors, and the canines, and even the first and second premolars. The smile of a person is primarily determined by these teeth, in that order of importance.

FIG. 8(a) to (i) illustrates another example similar to FIG. 7. In this example, the future teeth should be longer than the existing teeth, but the "shape" of the teeth should remain unchanged.

This can simply be done by shifting the lower curve 42 slightly downwards in FIG. 8(a), where it can be seen that the curve 42 is at a distance from the bottom of the teeth.

As mentioned above, the computer program automatically determines the FDI-number (based on the location on the grid) and the characteristic points shown in FIG. 8(c) by analysing a digital representation of the oral space (e.g. based on a frontal 2D picture), for example using edge detection techniques.

Based on this input, the computer program can then search the database, and will provide a limited set of candidate matching teeth. (in the example: only three candidates). The candidate tooth which the highest matching score is automatically preselected, in this example: proposal 3 of FIG. 8(f). FIG. 8(i) shows a portion of the restorative space, and optionally the positions of the characteristic points of the existing tooth, and preferably also a contour and also the positions of the characteristic points of the candidate future tooth, along with the matching score (in this case 96%).

While not shown in FIG. 8(a)-(i), a photo-realistic picture of the patient with the future tooth is preferably also shown, e.g. as in FIG. 16(b) or in FIG. 17(b).

Figure 9A:
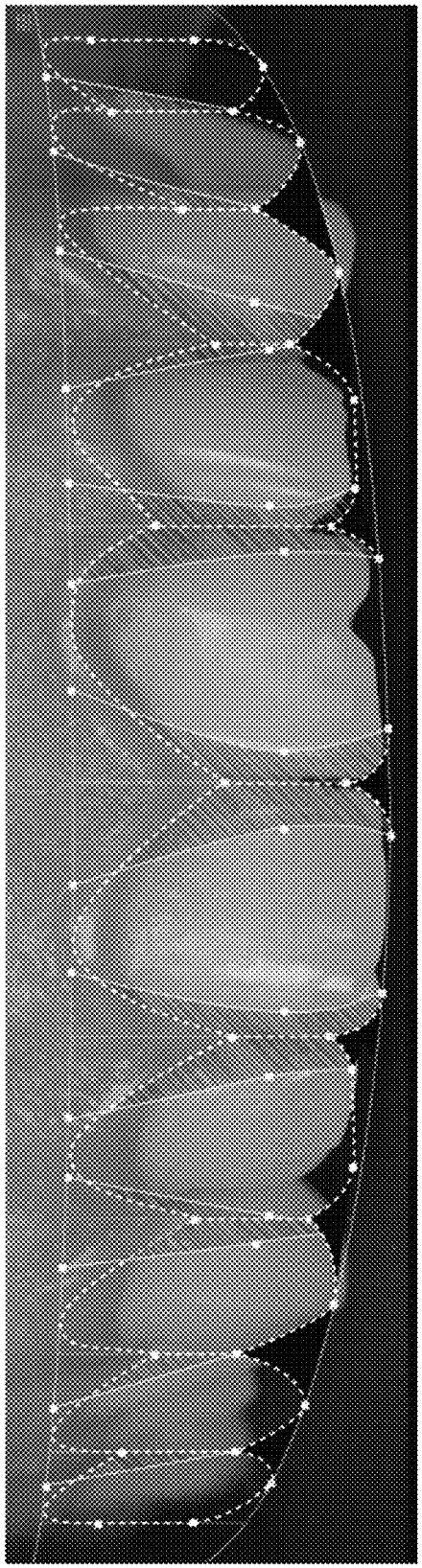
FIGS. 9(a) and (b) illustrate that a dental restoration based on a limited set of characteristic points can be defined not only for the frontal incisors but also for other teeth, e.g. the lateral incisors and/or the canines and/or the first premolars and/or the second premolars.
Figure 9B:
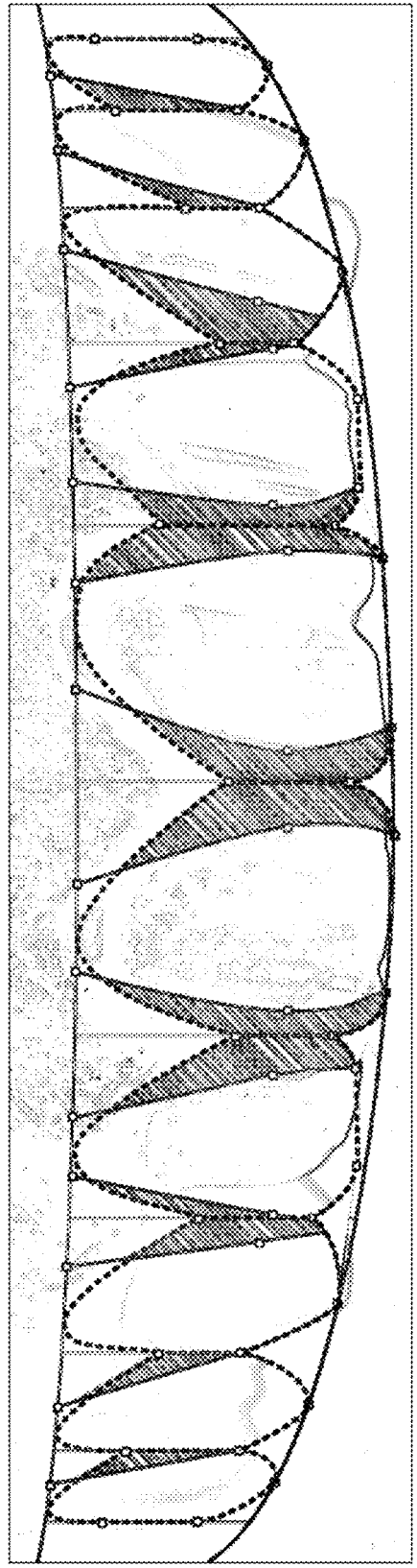

FIGS. 9(a) and (b) illustrate that a limited set of characteristic points can be defined not only for the frontal incisors but also for other teeth, e.g. for the lateral incisors and/or for the canines and/or for the first premolars and/or for the second premolars. FIG. 9(a) shows a grayscale image, FIG. 9(b) shows a line drawing, for illustrative purposes.

It is noted in this respect that the present invention is mainly concerned with dental restorations related to a beautiful smile, and hence the physical dimensions (e.g. the width), and the shape of the external surface of the teeth are of prime importance. It is noted in this respect that for example veneers typically need to be grinded or polished before they can be adhered to existing teeth.

While not worked out in detail, the principles of the present invention could also be extended to characterise the 3D shape of teeth, including the position and size and shape of protrusions and cavities in the premolars or molars. This can be accomplished by adding more characteristic points to the teeth to quantify said positions and sizes and shapes. And these characteristic points or values can then be added to a 3D-database to make the database searchable, etc.

Figure 10:
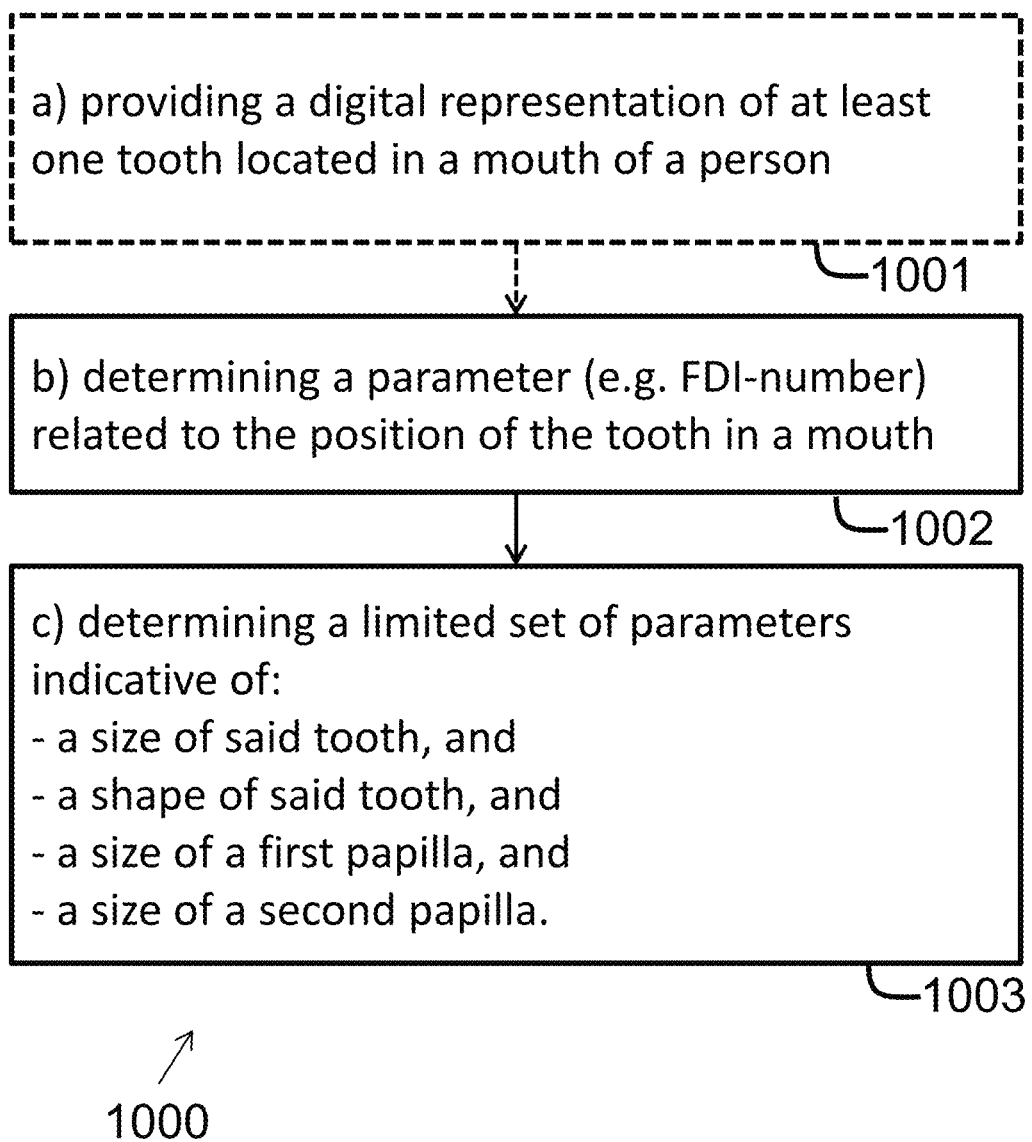
FIG. 10 is a flow chart of an exemplary computer implemented method of characterizing a tooth in an intraoral space, according to an embodiment of the present invention.

FIG. 10 is a flow chart of an exemplary computer implemented method 1000 of characterizing a tooth in an intraoral space. The method 1000 comprises at least the following steps:
  b) determining 1002 a parameter, e.g. an FDI-number to uniquely define the position of the tooth in the mouth;
  c) determining 1003 a limited set of parameters, for example less than 20 or less than 15 parameters, indicative of: a size of the tooth; and a shape of said tooth; and a size of a first papilla (e.g. the papilla located on the left of the tooth), and a size of a second papilla (e.g. the papilla located on the right of the tooth).

The parameters may comprise for example numerical values, and/or coordinates in a 2D picture, and/or coordinates in a 3D scan, and/or normalized values or percentages (with reference to a normalized rectangle or beam), etc.

Optionally, the method 1000 may also comprise step a) of providing 1001 a digital representation (e.g. a 2D picture and/or a 2D scan or a 3D scan) of at least one tooth located in a mouth of a person. This step may comprise for example: capturing a picture of a person using a digital camera, or using a web-cam, or using a facial scan, or using a 3D intraoral scan, or using a movie-camera; or receiving or retrieving such a picture or image or scan from a network or from an external device, or loading such a picture or image or scan from a storage medium (e.g. a memory stick or a hard disk) or from a network drive, or from the cloud.

As can be understood from the above, these parameters are strategically chosen so as to be able to represent (or at least approach) the size and shape of the tooth and the adjacent papilla's in a highly compact manner.

Step b) may further comprise: determining at least one parameter (e.g. a9 in FIG. 5a) for describing a first embrasure (e.g. adjacent a left side of the tooth); and determining at least one parameter (e.g. a10 in FIG. 5b) for describing a second embrasure (e.g. adjacent a right side of the tooth).

It was found that by taking the papilla heights into account, a more beautiful result was obtained, or expressed in technical terms: that a gap or opening under the papilla can be avoided.

The at least one parameter for describing a shape of the tooth may comprise exactly two parameters (e.g. a3 and a4, or a3 and a5, see FIG. 5) for describing a first transition line, and exactly two parameters (e.g. a6 and a7, or a6 and a8) for describing a second transition line. Experiments have shown that two pairs of only two parameters are sufficient to describe (or at least approach) the 3D shape of some of the teeth, in particular the canines, the first premolars and the second premolars, or at least a visible surface thereof.

Alternatively, the at least one parameter for describing a shape of the tooth may comprise exactly three parameters (e.g. a3, a4, a5) for describing a first transition curve, and exactly three parameters (e.g. a6, a7, a8) for describing a second transition curve. Experiments have shown that two pairs of only three parameters are sufficient to describe the 3D shape of some of the teeth, in particular the central and lateral incisors.

It is rather surprising that the 3D shape and the corresponding visual appearance of the teeth, can be described by only four or only six parameters, but these parameters allow to search in the database for digital teeth that "look the same or very similar" in a smile.

FIG. 11 is a flow chart of an exemplary computer implemented method 1100 for building a digital database or a digital library of teeth, in particular a library of natural teeth. The inventors realized that by including only healthy, beautiful natural teeth in the library, it is much easier to create a beautiful smile.

The computer implemented method 1100 of building a digital library may comprise the following steps:
 capturing or generating or providing 1101 at least one digital representation of said tooth in its clinical environment;
 characterising 1102 said tooth in its clinical environment, for example using the steps b) and c) of FIG. 10, thereby obtaining a limited set of parameters;
 optionally normalizing 1103 the digital representation, for example by rotating, and/or cropping, and/or scaling;
 optionally performing colour correction 1104; It is noted that colour correction may also be performed when extracting the tooth from the database.
 f) adding 1105 the at least one digital representation, and adding the limited set of parameters to said digital library, in a manner wherein the at least one digital representation is linked to the set of parameters.

In some embodiments of the present invention, at least a 3D scan is captured and stored in the database, and the characteristic points may be derived from the 3D representation itself, or from a 2D projection of said 3D scan.

In preferred embodiments of the present, both a 2D-picture or 2D-scan is captured, as well as a 3D scan, which are both stored in the database, and the characteristic points can be derived from the 2D-picture or 2D-scan.

Figure 12:
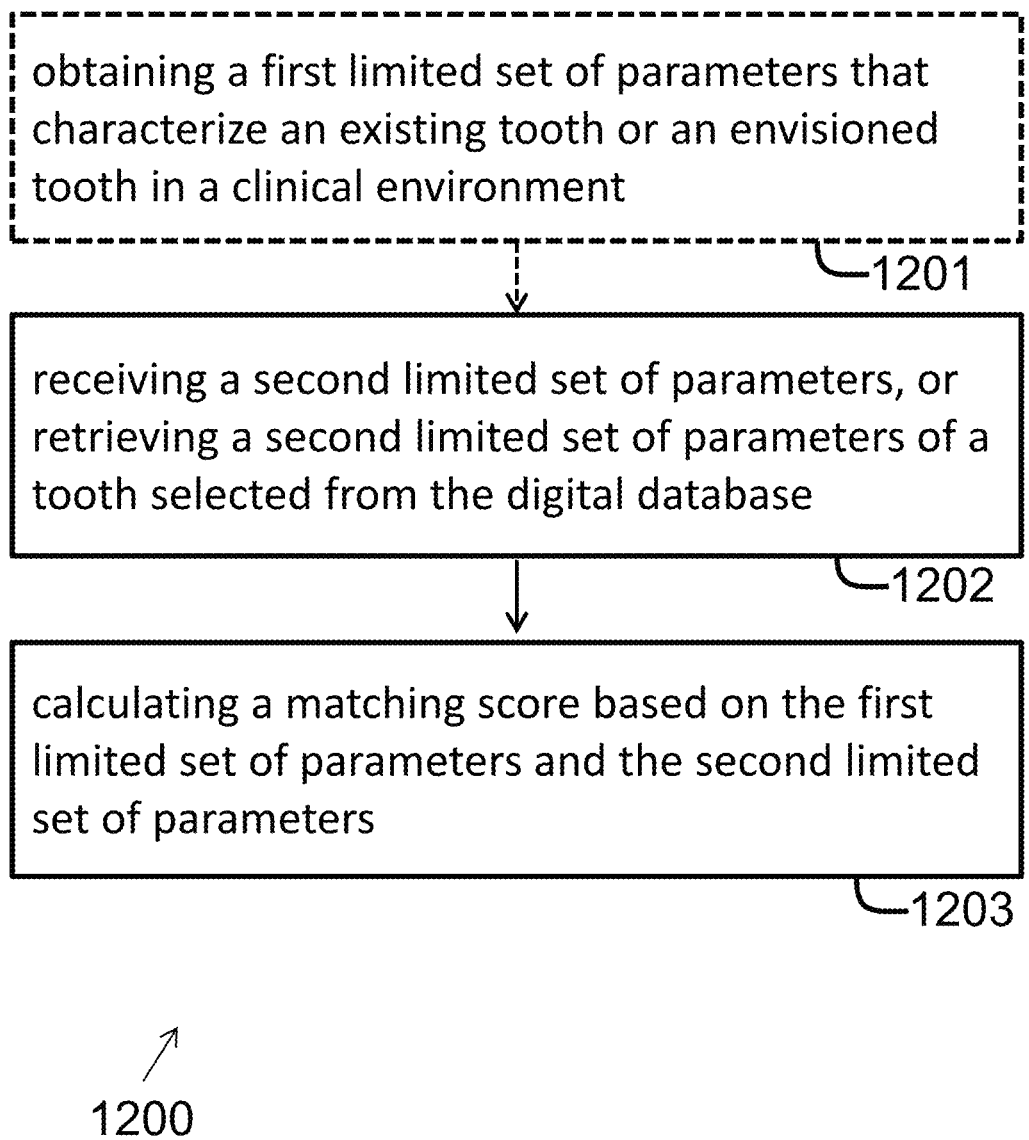
FIG. 12 shows a flow chart of a computer implemented method of determining or calculating a matching score between an existing tooth of a patient, and a virtual tooth from a digital database, according to an embodiment of the present invention.

FIG. 12 shows a flow chart of a computer implemented method 1200 of determining or calculating a matching score between an existing tooth in an intraoral space of a patient or of an envisioned tooth in said intraoral space of said patient (on the one hand), and a tooth selected from a digital database, e.g. a database as can be generated by the method shown in FIG. 11.

The method 1200 comprises the steps of:
 obtaining 1201 a first limited set of parameters that characterize the existing tooth or the envisioned tooth, e.g. using the method of FIG. 10;
 receiving a second set of parameters, or retrieving 1202 a second limited set of parameters of the tooth selected from the digital database;
 calculating 1203 a matching score based on the first limited set of parameters and the second limited set of parameters.

It is an advantage of this method that the matching score is based on values related to visual aspects, rather than for example merely on volume of objects. While a volume is also a technical term, it is hardly related to aspects of visual appearance or beauty.

In an embodiment, the matching score may be calculated based on a sum or weighted sum of absolute values of differences between corresponding parameters related to size (e.g. Height or Width or proportion) and/or papilla height and/or shape. The matching score may for example be calculated as 100% minus said sum. Preferably the matching score is set to zero ("no match") if the "tooth number" (e.g. FDI number) is different.

In an embodiment, the matching score may be calculated based on a sum or weighted sum of square values of differences between corresponding parameters related to size (e.g. Height or Width or proportion) and/or papilla height and/or shape. The matching score may for example be calculated as 100% minus said sum. Preferably the matching score is set to zero ("no match") if the "tooth number" (e.g. FDI number) is different.

It is an advantage of using such matching score that it is computationally very simple, yet achieves excellent results.

The weight factors may be predefined constants, for example chosen such that:
 i) the weight factor of the term related to difference in size (e.g. height and/or width and/or proportion) may be larger than or smaller than or equal to the weight factor of the term related to difference of papilla heights; and/or
 ii) the weight factor of the term related to difference of embrasures may be smaller than the weight factors related to difference in shape; and/or
 iii) the weight factor of the term related to difference in shape may be smaller then both the weight factor related to size and the weight factor related to difference of papilla height,
 and preferably all of the above.

In a specific embodiment, the weight factor related to difference in size or proportion is equal to about 40%, and the weight factor related to difference of papilla height is equal to about 30%, and the weight factor related to difference in shape (e.g. transition curves) is equal to about 20%, and the weight related to difference of embrasures is equal to about 10%.

In another specific embodiment, the weight factor related to difference in size or proportion is equal to about 30%, and the weight factor related to difference of papilla height is equal to about 40%, and the weight factor related to difference in shape (e.g. transition curves) is equal to about 20%, and the weight related to difference of embrasures is equal to about 10%.

But of course the present invention is not limited to these particular examples.

Figure 13:
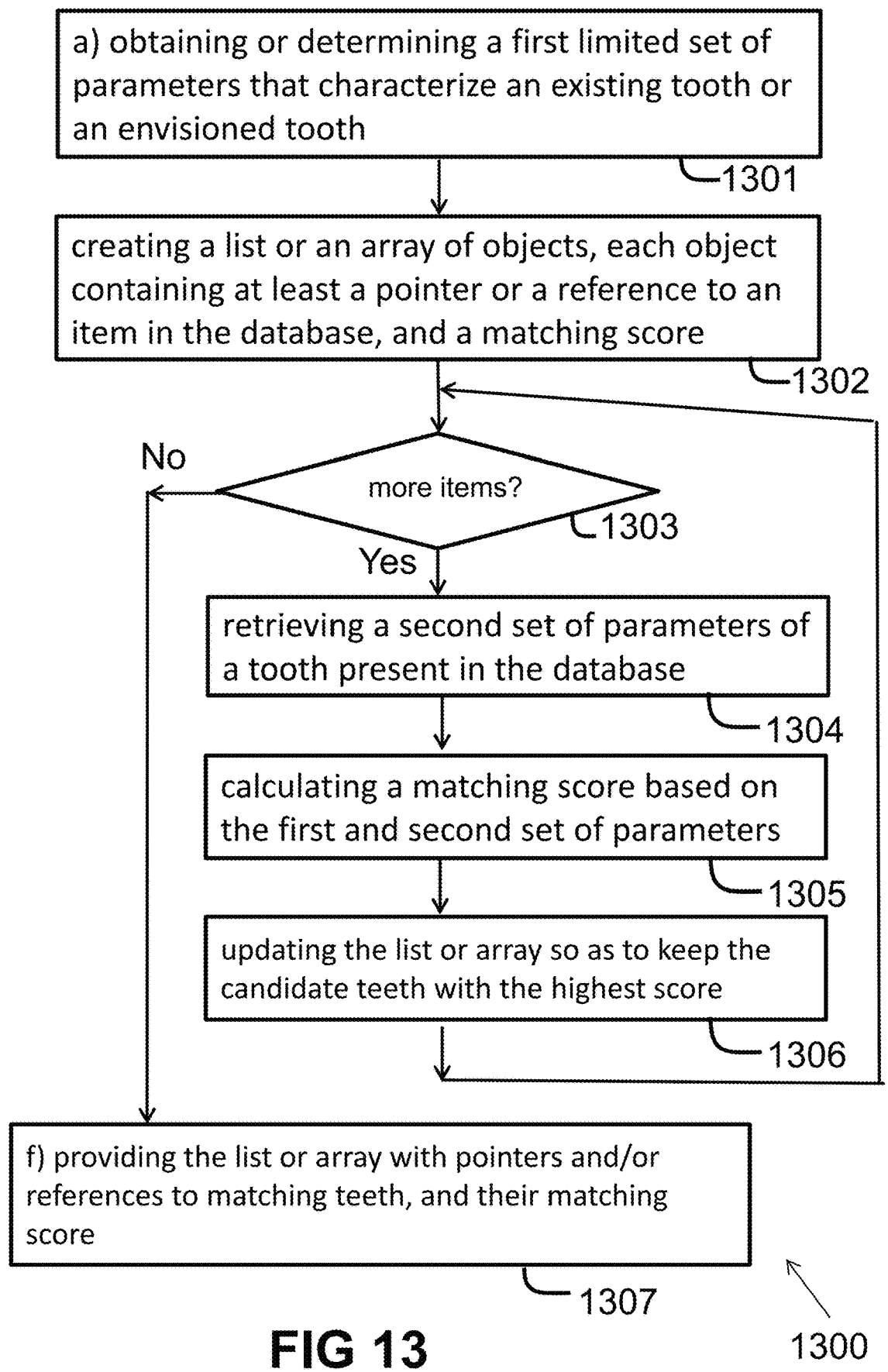
FIG. 13 shows a flow chart of a computer implemented method of searching in a digital database of teeth and selecting a limited set of candidate teeth with the best matching scores, according to an embodiment of the present invention.

FIG. 13 shows a flow chart of a computer implemented method 1300 of searching in a digital database of teeth for a limited number (e.g. at most ten, or at most seven, or at most five, or at most three, or only two, or only one) matching teeth. The method comprises the steps of:
a) obtaining or determining 1301 a first limited set of parameters that characterize the existing tooth or the envisioned tooth, e.g. using the method of FIG. 10;
b) creating 1302 a list or an array of objects, each object containing at least a pointer or a reference to items of the database, and a matching score; (and e.g. initialising the list or array);

For at least a subset of the digital teeth stored in the digital library, performing the steps:
c) retrieving 1304 a second limited set of parameters of a tooth present in the digital database;
d) calculating 1305 a matching score based on the first limited set of parameters and the second limited set of parameters;
e) updating 1306 said list or array so as to keep pointers to the candidate teeth having the highest score;
f) providing 1307 the list or array with pointers and/or references to matching teeth, and their matching scores.

It is a major advantage of the limited set of parameters that the database can be searched, and that matching teeth can be found, moreover in a fast and highly efficient manner. This dramatically reduces the time required for planning a dental treatment, e.g. for what is known in the art as "designing a new smile".

Figure 14:
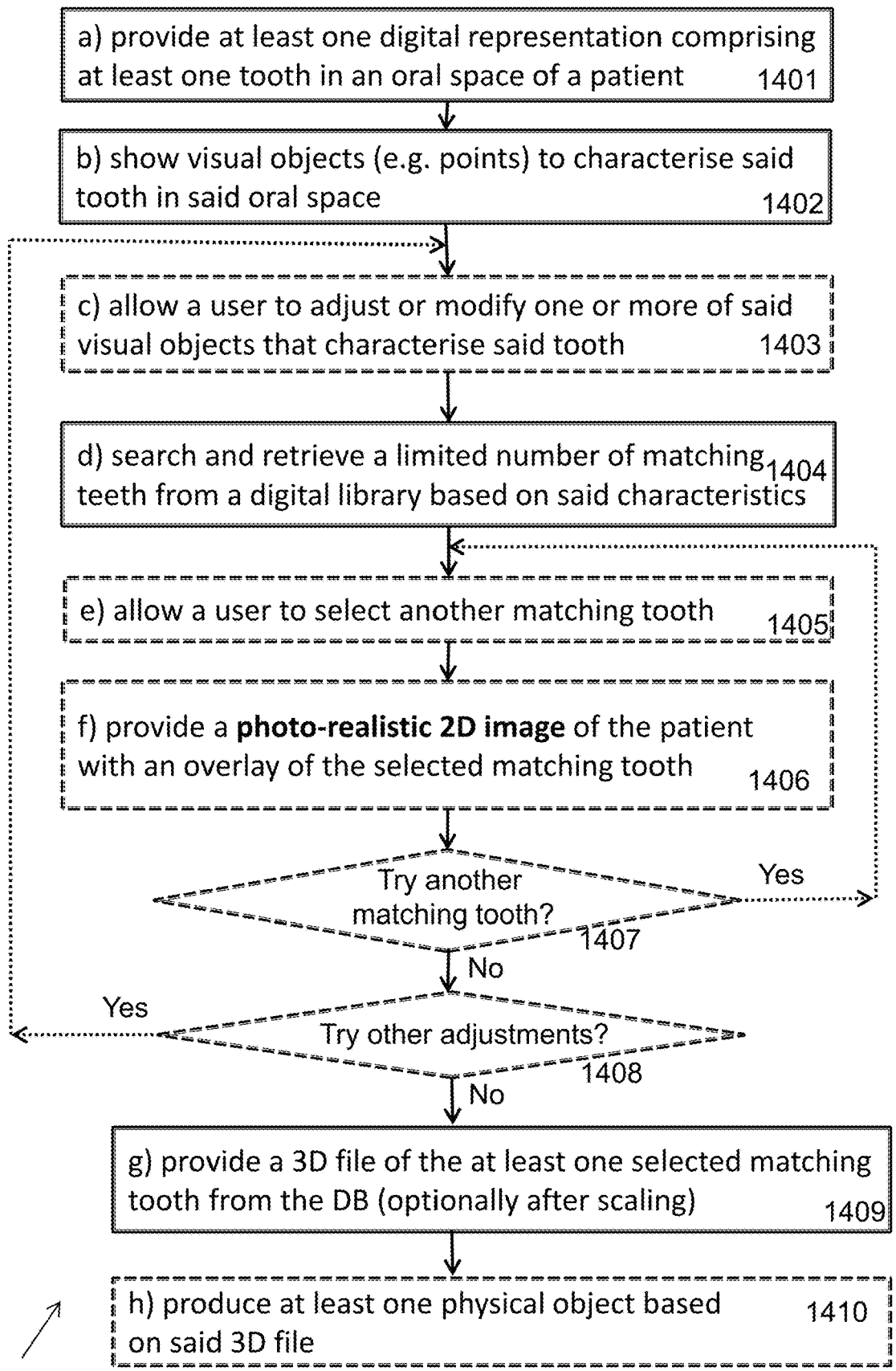
FIG. 14 is a flow chart of a computer implemented method for providing a 3D file for producing a dental restoration automatically or semi-automatically, according to an embodiment of the present invention. Or stated in other words, a computer implemented method for allowing a user to design or define or plan a dental restoration.
Figure 15:
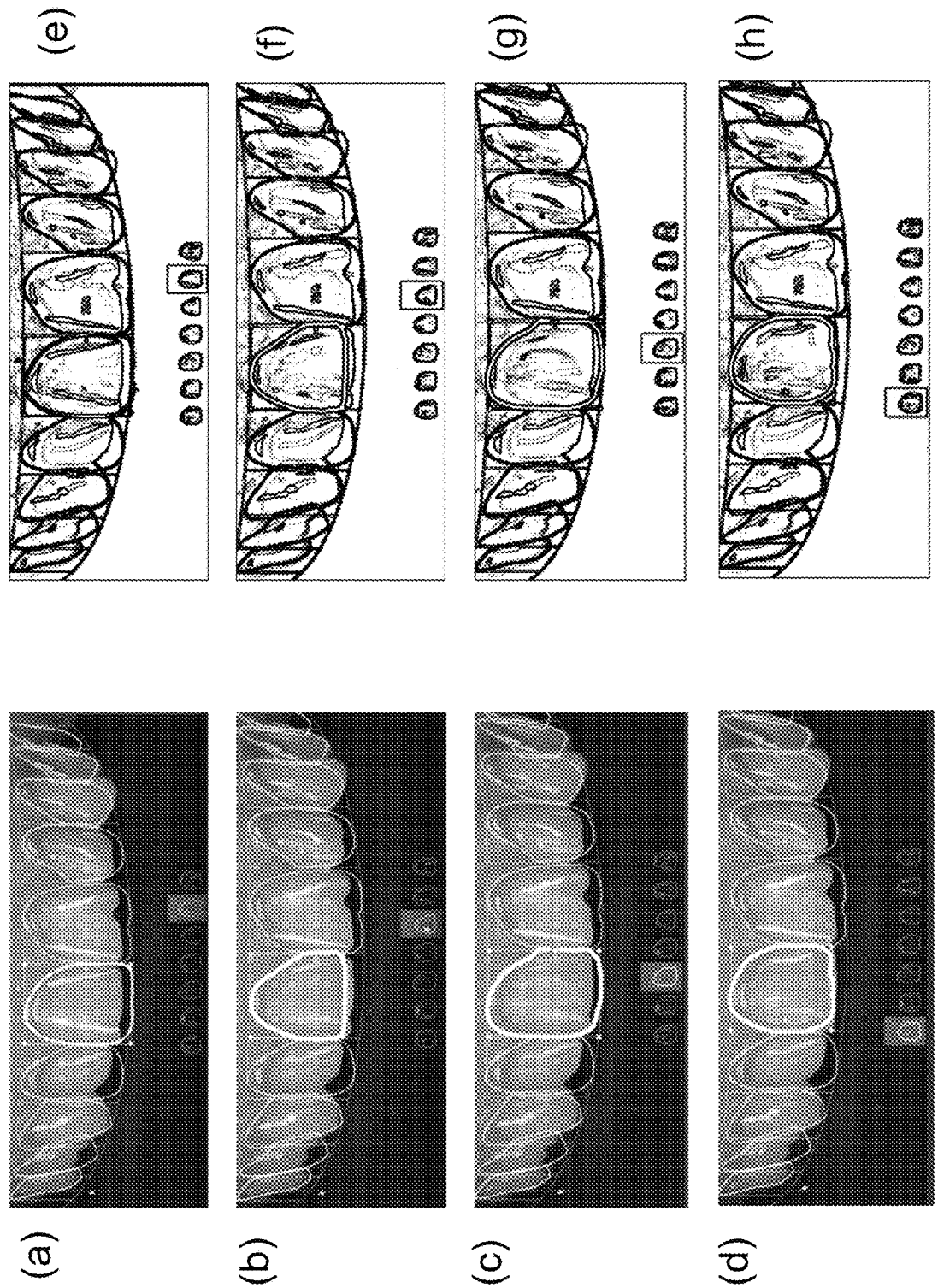
FIG. 15(a) to (h) show exemplary screenshots of a computer program product adapted for performing one or more steps of the computer implemented method shown in FIG. 14, inter alia allowing a user to specify target parameters (of envisioned teeth), for automatically searching the database for matching teeth, for presenting the user with a limited set of candidate matching teeth, and for allowing the user to select another tooth from the limited set of candidate matching teeth.

FIG. 14 shows a flow chart of a computer implemented method 1400 for providing a 3D file for producing a dental restoration automatically or semi-automatically. Or stated in other words, a computer implemented method for allowing a user to design or define or plan a dental restoration. The method comprises the steps of:
a) providing 1401 at least one digital representation of at least one tooth in an oral space of a patient, for example providing one or more picture(s) and/or scan(s), for example a 2D frontal picture, and/or a 3D facial scan, and/or a 3D intraoral scan, etc.;
b) showing 1402 a plurality of visual objects (e.g. a grid and/or points) to characterise said at least one tooth in said oral space;
c) optionally allowing 1403 a user to repeatedly 1408 adjust and/or modify one or more of said visual objects that characterise said tooth;
d) searching and retrieving 1404 a limited number of candidate matching teeth from a digital library of teeth, based on said characteristics, for example using the method illustrated in FIG. 13;
e) optionally allowing 1405, 1407 a user to repeatedly select another matching tooth from the limited set of candidate matching teeth;
f) optionally providing 1406 a photo-realistic 2D image of the patient with an overlay of the selected matching tooth, optionally after scaling;
g) providing 1409 a 3D-file of the at least one selected matching tooth, optionally after scaling.

Figure 8:
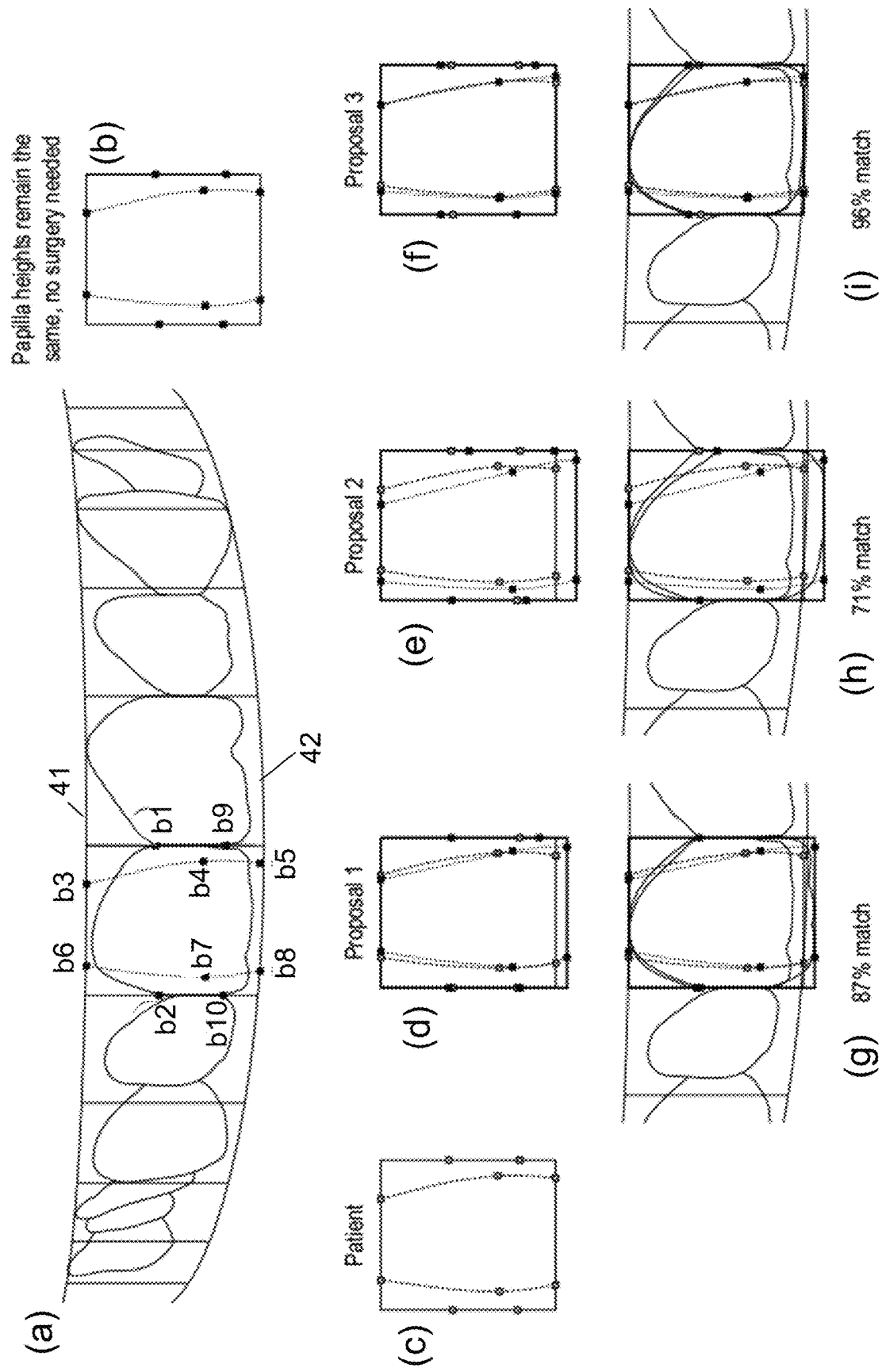
FIGS. 8(a) to (i) illustrate an example how in embodiments of the present invention, and based upon an image or scan of one or more existing teeth, a new set of longer teeth can be easily and rapidly be defined, and how a limited number of matching teeth can be found in a digital library of teeth.

This method is directed to a computer implemented method that for example starts from a 2D-picture (e.g. as in FIG. 4a), shows a grid and/or characteristic points (e.g. as shown in FIG. 5 to FIG. 8), allows a user to modify the characteristic points to thereby specify how the future teeth should look like, provides the user with a limited number of (good) matching results from the database as the user modifies some characteristic points (e.g. as shown in FIG. 8), and finally provides a 3D-file allowing the envisioned tooth to be manufactured.

The method may further comprise step h) of producing at least one physical object based on said 3D file, for example by rapid manufacturing techniques, such as e.g. by 3D-printing.

The end result of this method is a physical object.

FIG. 15(a) to (d) show screenshots of an exemplary user interface of a computer implemented method adapted for performing one or more steps of the method shown in FIG. 14, in particular step b) to e). In this example, the computer program searches the database, and retrieves the seven best matching candidates, and shows a miniature picture or a miniaturized contour of the candidate matching teeth, preferably each with a matching score, from which the user (e.g. the dentist) can select one, a contour of which is subsequently rendered in the picture representing the restoratory space.

FIG. 15(e) to FIG. 15(h) are line drawings of FIG. 15(a) to FIG. 15(d) for illustrative purposes.

While not explicitly shown in FIG. 15, preferably also a photorealistic image of the patient is provided with a color picture of the one or more tooth selected from the database (not only the contour), an example of which is shown in FIG. 16(b). This photorealistic 2D-picture is preferably provided on the same screen or on the same display as the picture showing the restoratory space, for example side by side as shown for example in FIG. 17(b) and FIG. 17(c).

FIG. 16(a) shows a 2D picture or a 3D facial scan of a patient before dental treatment, and FIG. 16(b) shows a clinical realistic and photo-realistic 2D picture of how that patient will look like after dental treatment, for example after the selected teeth or veneers or the like are produced, and bonded to the existing teeth.

FIG. 16(c) and FIG. 16(d) are line drawings for FIGS. 16(a) and (b) for illustrative purposes.

FIG. 17(a) and FIG. 17(c) show a 2D picture of the teeth shown in FIG. 2(a), overlaid with a grid, as described above.

Figure 4:
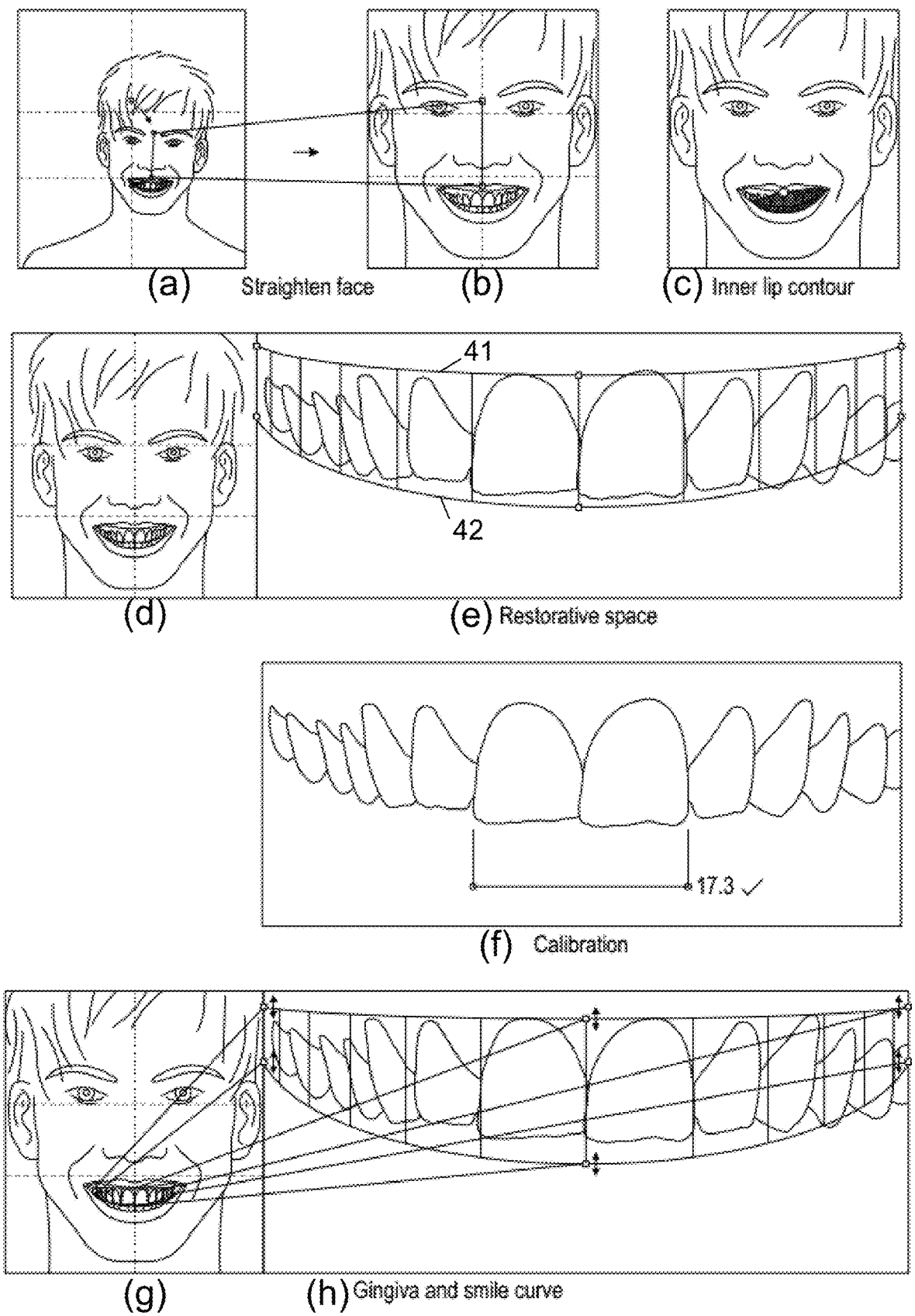
FIG. 4(a) to FIG. 4(h) show several steps which can be used in embodiments of the present invention, for obtaining an image (e.g. a normalized image) of an intraoral space as digital input for planning or designing or defining a dental restoration.

FIG. 17(a) shows the restoratory space based on a frontal 2D picture of the patient, with the addition of a grid (as described in FIG. 4). Characteristic points for each tooth are automatically determined by the computer program, and shown to the user. The user can optionally modify the position of one or more of these points.

FIG. 17(c) shows the restoratory picture with multiple contours of best matching teeth for each particular location. The best matching teeth retrieved from the library may come from different people. What is shown is the automatic proposal (or preselection of teeth) made by the computer program product for each of the ten teeth. The user can simply accept this proposal, or can select a different matching tooth for one or more of the teeth individually, as described above.

FIG. 17(b) shows a photo-realistic picture of how the patient will look like after dental treatment. As can be appreciated, using methods according to the present invention, the poor clinical situation illustrated in FIG. 2, can be converted into the beautiful smile shown in FIG. 3 and FIG. 17(b).

FIG. 18(a) to (c) are line drawings for FIG. 17(a) to (c), provided for illustrative purposes.

FIG. 19(a) to FIG. 19(f) and FIG. 20 illustrate another aspect of the present invention, mainly related to movement of the "lower curve" 1902. The "lower curve" was already described above, for example in FIG. 4(h). The lower curve may be used as a "drawing reference" when modifying the length of individual teeth, e.g. to make sure that the lengths of the individual teeth are more or less consistent.

The inventors came to a further insight that the generation of the dental design can be further improved. Indeed, rather than using the lower curve 42 merely as a comparative reference when manually increasing or decreasing the height of individual teeth, they realized that the time required to generate a dental design can be further reduced by adjusting the height of at least two teeth or all teeth of the upper jaw simultaneously. When taking into account that in the present invention individual teeth are individually optimized, such functionality is far from trivial. It is largely thanks to the very fast search algorithm, which is based on the characterisation of teeth as described above, and indexing the database based on that characterisation, e.g. by using an index based on the limited set of parameters, that such improvement is feasible.

To get an idea of the order of magnitude of the speed, tests were performed using a digital library containing more than 1100 digital teeth, and the time required to find five best matching teeth for all twelve teeth of the upper jaw was a value in the order of about 5-25 msec. For completeness it is noted that the measurement did not take into account the time for retrieving the actual digital representation (e.g. pictures) of these teeth from the database, and overlaying these pictures over the smile of the patient, but the reader will appreciate that the search is so incredibly fast that it allows an almost instant update of the picture in response to a modification of the lower curve.

In an embodiment, the smile of the patient is dynamically updated when changing the lower curve, for example by dragging a visual object or marker located on the lower curve 1902 using a pointer device, e.g. using a mouse device.

Figure 19A:
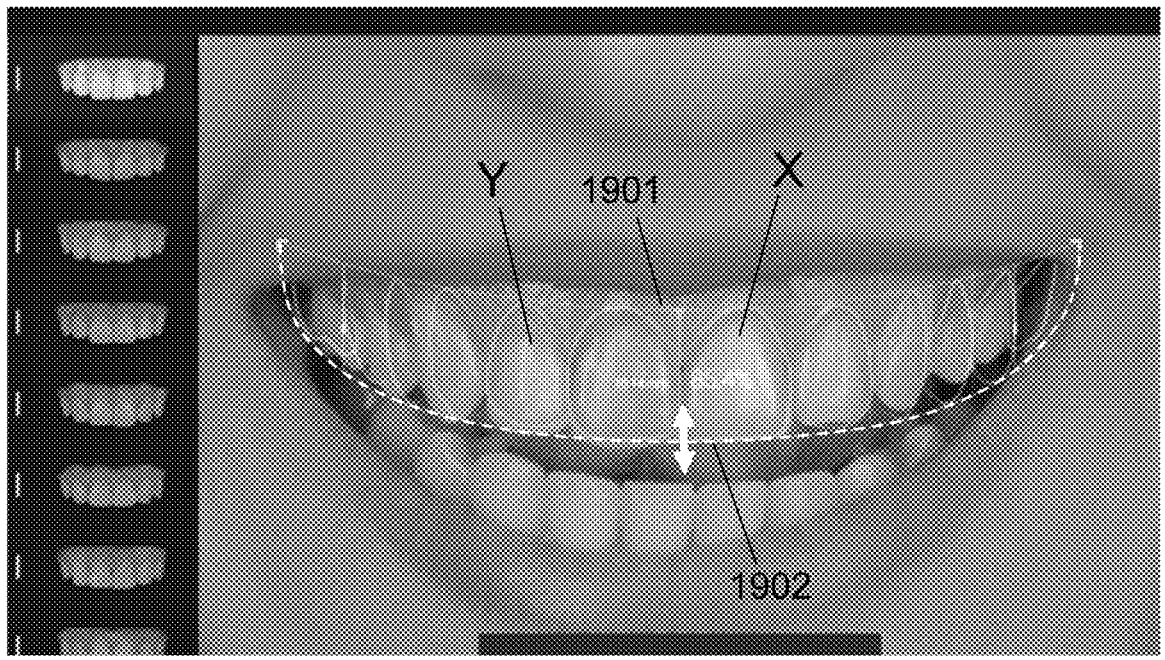
FIG. 19(a) to FIG. 19(f) illustrate how adjustment of a position and/or shape of the "lower curve" can be used to define and/or adjust the length of multiple teeth in a highly efficient manner.
Figure 19B:
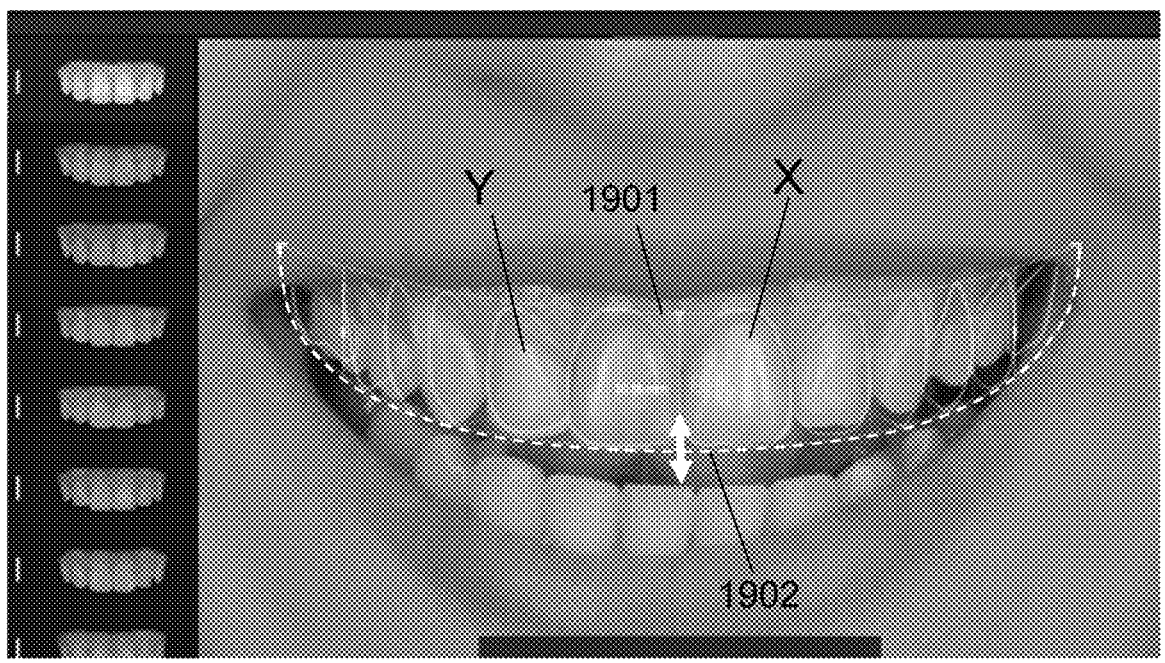

FIG. 19(a) and FIG. 19(b) illustrate what happens in embodiments of the present invention in which this functionality is implemented. While it would be much easier to demonstrate in a short video-clip how "dragging of the lower curve works", unfortunately patent applications are limited to still pictures. FIG. 19(a) shows a screenshot of the video-clip taken at a first moment in time, and FIG. 19(b) shows a screenshot of the video-clip taken at a second moment in time. The time interval between the two pictures was chosen relatively long for illustrative purposes, namely to illustrate two effects that typically occur when "dragging the lower curve".

Consider tooth X in FIG. 19(a), where a best match was found in the database having a matching score of 85.4%. When the "lower curve" 1902 is moved downwards, the parameters of the tooth X are adjusted accordingly, but this did not result in another best matching tooth for tooth X. The same tooth from the library was still considered to be the best match for tooth X, despite the fact that the matching score decreased to 82%. This is still true in FIG. 19(b). It was only later, when the lower curve 1902 was moved further, that another best matching tooth was presented for the patient tooth X.

Consider tooth Y in FIG. 19(a), where a first best matching tooth was found in the database for this position of the lower curve 1920, but where another best matching tooth was found when the lower curve 1902 was moved to the position of FIG. 19(b), as can be appreciated from the different contours of the best matching tooth for tooth Y in FIGS. 19(a) and (b).

In practice, when slowly dragging the lower curve 1902, these two effects occur for all the teeth, resulting in the various teeth remaining unchanged for a certain period, and then suddenly change shape, seemingly in a pseudo-random manner.

Of course, the technical description in this document is different from a real user experience, who will "see" combinations of relatively short teeth as the lower curve 1902 is moved upwards, and various combinations of relatively long teeth as the lower curve 1902 is moved downwards, and various combinations in between, allowing the user to select an appropriate length.

While dragging the lower curve, the algorithm will typically automatically select the best matching tooth, and show this tooth in overlay. After dragging the lower curve 1902, the user may further adjust one or more teeth individually, e.g. by moving some of its characterising points, or by selecting another candidate tooth from the limited list of teeth for the tooth concerned.

Figure 19C:
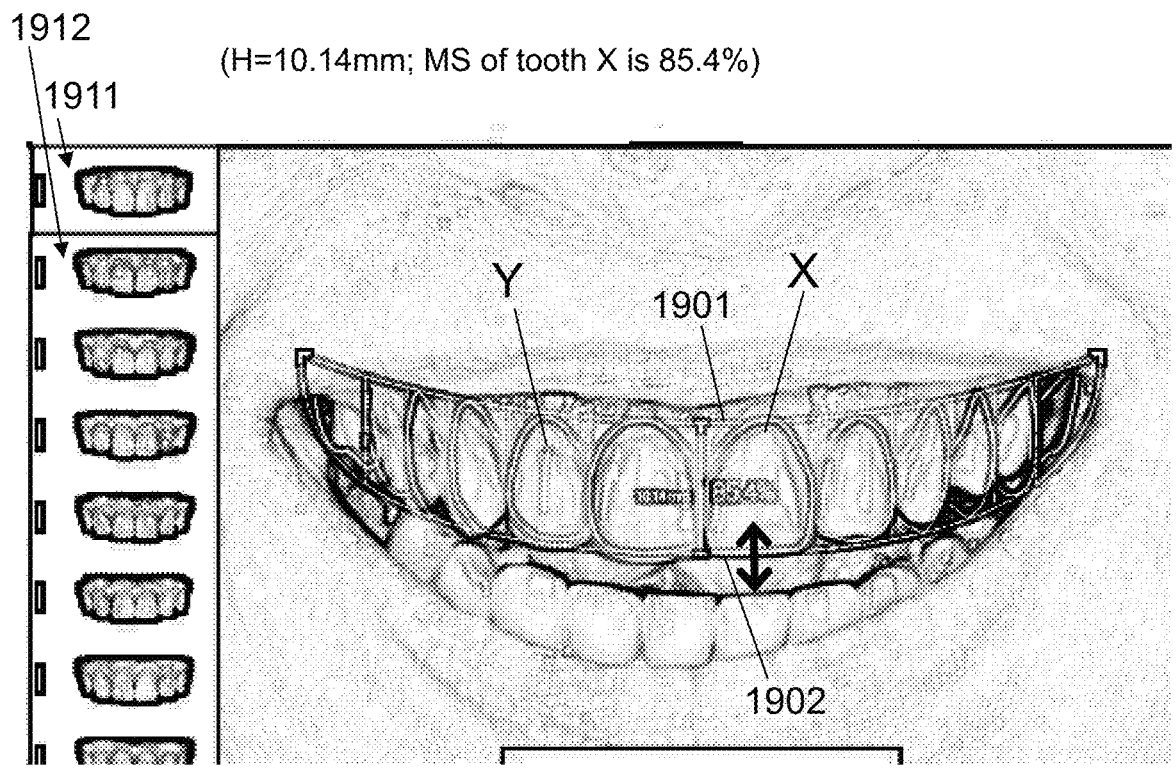
Figure 19D:
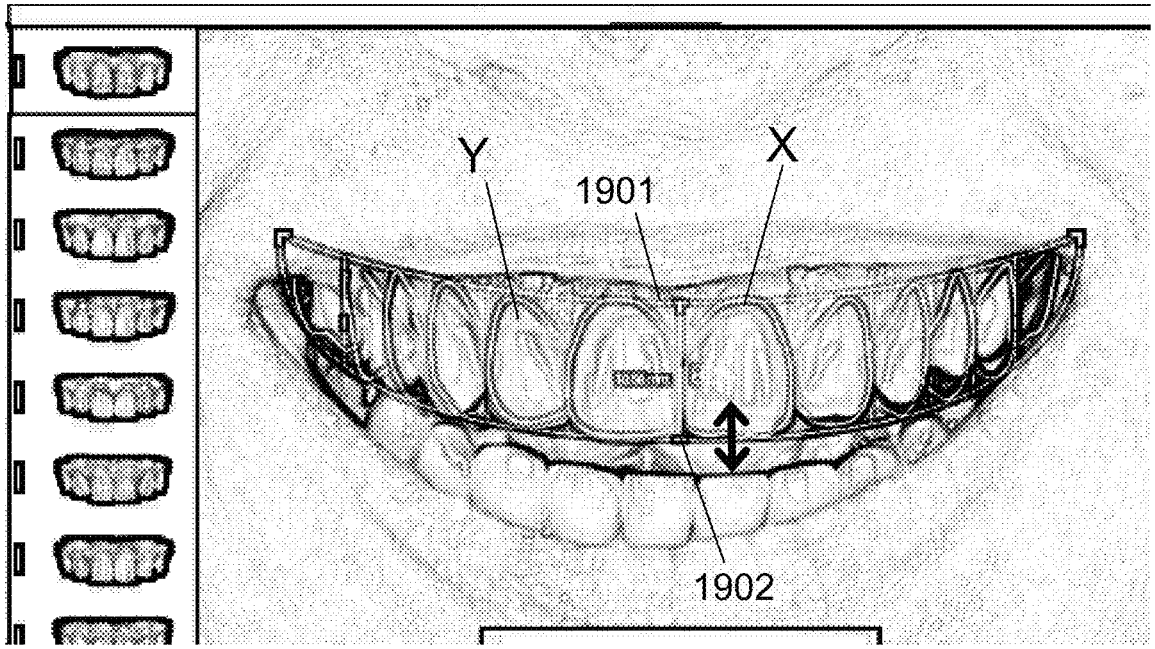
Figure 19E:
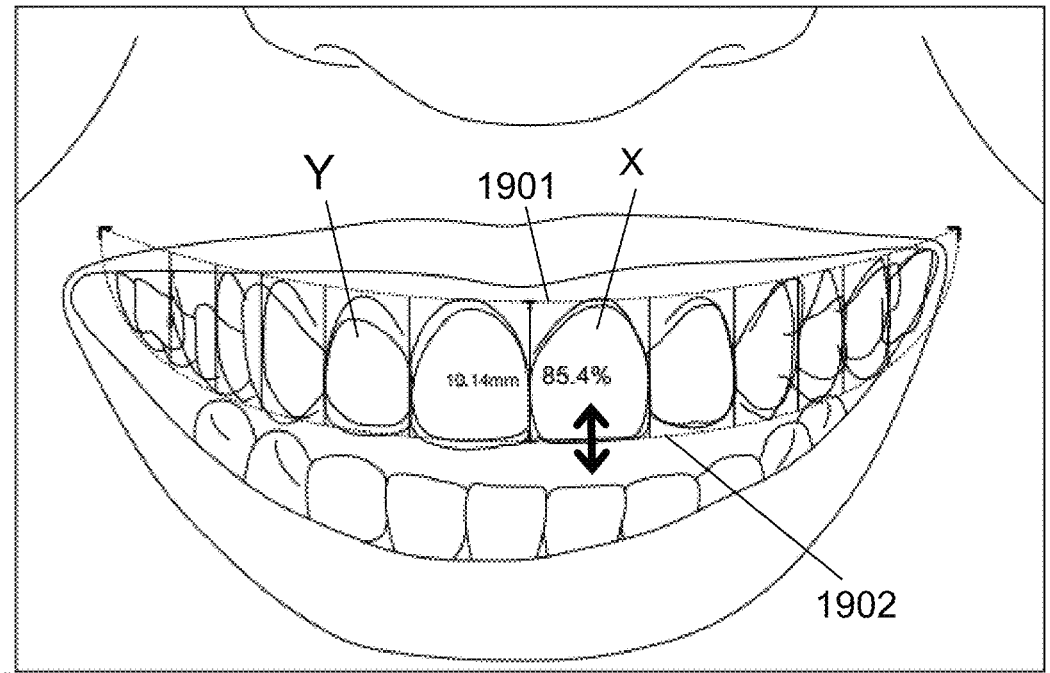
Figure 19F:
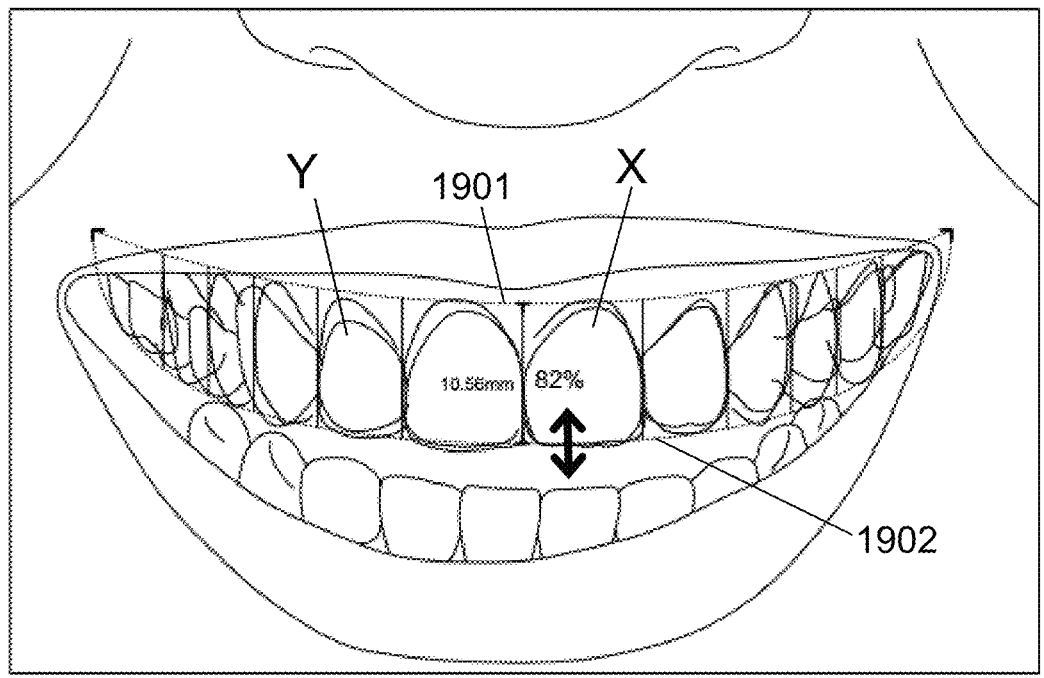

FIG. 19(a) and FIG. 19(b) are grayscale pictures, showing photo-realistic images. FIG. 19(c) and FIG. 19(d) show a sketch of these grayscale pictures, better illustrating the contours of the teeth. FIG. 19(e) and FIG. 19(f) are "line drawing" of the same two pictures. FIG. 19(c) to FIG. 19(f) are provided for illustrative purposes.

In the example of FIG. 19(a) to FIG. 19(d) more than five combinations of "matching candidates" are shown on the left part of the picture, but of course the present invention is not limited hereto, and the invention will also work if less than five matching candidates are searched or shown, for example only four, or only three, or only two.

It is also noted that the candidate matching teeth (for a particular tooth position) may be presented to the user in a different way, for example in a manner similar to FIG. 16(a) to FIG. 16(d), or in another suitable manner.

Figure 5:
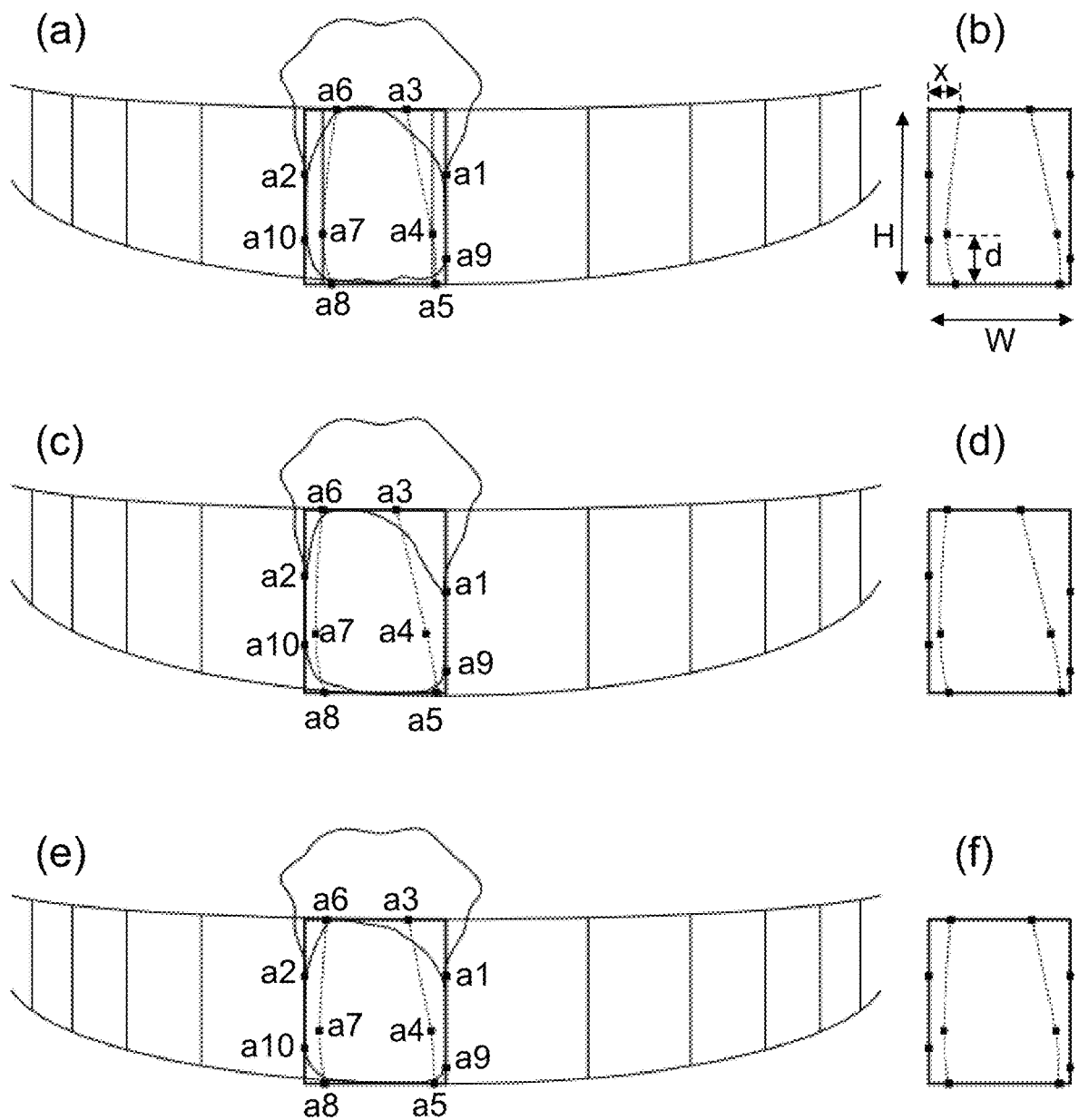
FIG. 5(a) to FIG. 5(f) show examples of how the shape and size of a central incisor in its environment (in the oral cavity) can be characterised or specified, using a limited number of parameters, e.g. a limited number of characteristic points, according to an aspect of the present invention.
Figure 20:
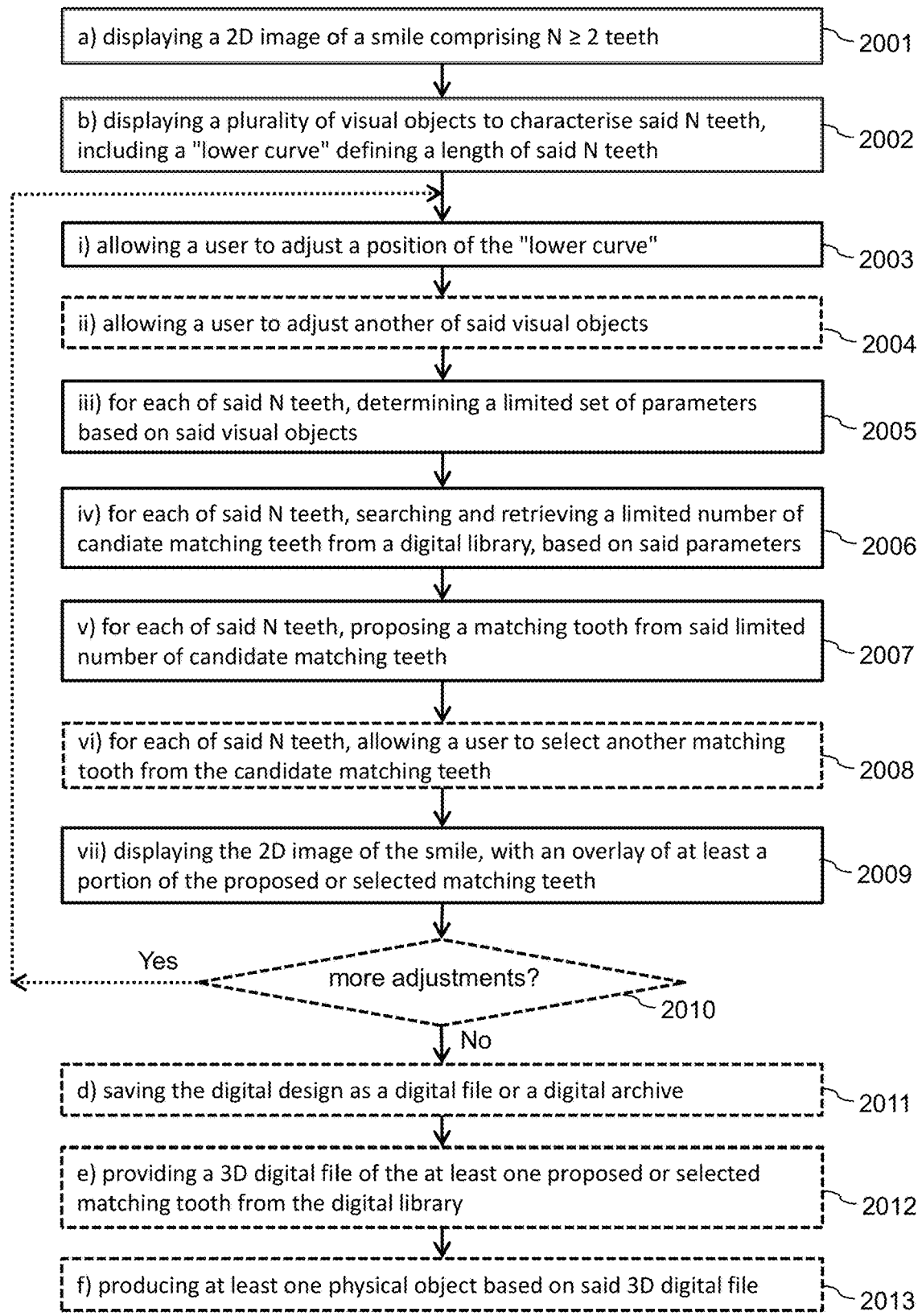
FIG. 20 shows a flowchart of a method of generating a dental design, as proposed by the present invention.

FIG. 20 shows a flowchart of a method of generating a dental design, as an embodiment of the present invention. The method 2000 comprises the following steps:

a) displaying 2001 a 2D image of a smile comprising a plurality of at least two or at least four or at least six teeth, e.g. on a display device such as an LCD display. The image may be captured by a digital camera. The at least two teeth may be two frontal incisors of the upper jaw.

b) displaying 2002 a plurality of visual objects (e.g. one or more lines, markers, a grid comprising an upper curve and a lower curve of the upper teeth and a plurality of vertical line segments, etc.) to characterise said plurality of at least two teeth in said smile. The plurality of visual objects includes a "lower curve" 1902 defining a length of said plurality of at least two teeth. The "lower curve" is preferably situated at or near an incisal edge of the upper teeth. The visual objects may characterize for example an overall size and/or shape and/or curvature of the at least two teeth. The visual objects may be the set or a subset of the visual objects described in FIG. 5(a) to FIG. 8(i), but the present embodiment is not limited thereto, an other visual objects may also be used c) performing at least once the following steps:
  i) allowing 2003 a user (e.g. a dentist) to adjust a position of the lower curve 1902, e.g. in order to increase or decrease the length of said plurality of at least two teeth;

ii) optionally allowing 2004 a user to adjust one or more other of said visual objects, e.g. in order to increase or decrease a width, or to change a lateral position, or to change the shape of one or more of said teeth;

iii) for each of said at least two teeth, determining 2005 a limited set of parameters based on said visual objects;

iv) for each of said at least two teeth, searching and retrieving 2006 a limited number of candidate matching teeth from a digital library of individual teeth, using the limited sets of parameters of each tooth, and using a matching score for each tooth individually, e.g. in the same way or in a similar way as described in FIG. 5(*a*) or FIG. 8(*i*). The digital library is preferably indexed for allowing a fast search. The index file is preferably stored locally, e.g. on a local storage device or a local memory device, e.g. on a memory stick, or on a hard disk of a computer on which the algorithm is being executed. The digital images of the digital library may be stored on a local storage device, or on a network drive, or in the cloud.

v) for each of said at least two teeth, proposing 2007 a matching tooth from said limited number of candidate matching teeth, e.g. proposing the best matching tooth from said candidate matching teeth. The limited set of candidate teeth may for example be presented as shown on the left side of FIG. 19(*c*), where the upper subpicture 1911 shows a downscaled version of the smile of the patient with twelve best matching teeth shown in overlay in their respective positions, the second subpicture 1912 shows a downscaled version of the smile of the patient with twelve second best matching teeth shown in overlay in their respective positions, etc.

vi) optionally, for each of said at least two teeth, allowing 2008 a user to select another matching tooth from the candidate matching teeth, e.g. by clicking on one of the teeth in one of the subpictures on the left of FIG. 19(*c*);

vii) displaying 2009 the 2D image of the smile, with an overlay of at least a portion of the (automatically) proposed or (manually) selected matching teeth, preferably as a relatively large picture. In some embodiments, the proposed or selected matching teeth are not scaled. In other embodiments, the proposed or selected matching teeth are scaled in only one direction (e.g. only vertical), or are scaled in two directions (e.g. vertically and horizontally) to further improve the matching score. The scaling factor may be a value in the range from 90% to 110%.

d) optionally 2011 saving the digital design as a digital file or a digital archive, e.g. by saving at least the position of the lower curve 1902, and preferably also the positions of the plurality of visual objects and preferably also a reference in the digital library to the proposed or selected matching teeth, and/or by a copy thereof.

e) optionally providing 2012 a 3D digital file of the at least one proposed or selected matching tooth from the digital library, with or without scaling;

f) optionally producing 2013 at least one physical object based on said 3D digital file, e.g. by 3D-printing.

While individual features are explained in different drawings and different embodiments of the present invention, it is contemplated that features of different embodiments can be combined, as would be obvious to the skilled person, when reading this document.

The invention claimed is:

1. A computer implemented method of generating a dental design, the method comprising the steps of:
   a) displaying a 2D image comprising a smile or an oral space of a patient comprising at least two teeth;
   b) displaying a plurality of visual objects to characterise said at least two teeth in said smile; and
   c) performing at least once the following steps:
      i) determining, by the computer, a first limited set of parameters for each tooth individually of said at least two teeth based on said visual objects, wherein the first limited set of parameters are used to digitally characterize each tooth of the at least two teeth in said smile or the oral space of the patient;
      ii) for each of said at least two teeth, searching and retrieving, by the computer, a limited number of candidate matching teeth from a digital library of individual teeth by:
         determining a matching score for each tooth individually by quantitatively comparing the determined limited first set of parameters for each tooth with one or more limited second set of parameters of a plurality of individual teeth stored in the digital library to determine a degree of similarity between each tooth and the plurality of individual teeth stored in the digital library,
         identifying one or more individual teeth stored in the digital library as candidate matching teeth when the matching score of the respective individual teeth meets a predetermined threshold, and
         retrieving the limited number of candidate matching teeth by ranking the candidate matching teeth based on the matching score;
      iii) for each of said at least two teeth, proposing or selecting a matching tooth from the limited number of candidate matching teeth leading to a faster and more individually optimized tailored dental design;
      iv) displaying the 2D image of the smile of the patient with an overlay of at least a portion of the proposed or selected matching teeth such that a user can see a realistic picture of how the patient will look after dental treatment in a fast and more efficient manner.

2. The computer implemented method of claim 1, wherein step c) further comprises: allowing a user to adjust one or more of said visual objects, modify one or more of said visual objects, or both.

3. The computer implemented method of claim 1, wherein step c) further comprises: allowing a user to select another matching tooth from the limited set of candidate matching teeth.

4. The computer implemented method of claim 1, further comprising: saving the dental design as a digital file on a non-volatile memory or on a storage device.

5. The computer implemented method of claim 1, wherein the method further comprises: providing a 3D-file of at least one proposed or selected matching tooth.

6. The computer implemented method of claim 5, further comprising: producing at least one physical object based on said 3D file.

7. The computer implemented method of claim 1, wherein the plurality of visual objects of step c) include a lower curve defining a height of at least some upper teeth in the smile;

and wherein the method further comprises the step of:
allowing a user to adjust a position of said lower curve, and
adjusting the limited set of parameters of each of said at least two teeth in response to an adjustment of the position of the lower curve.

8. The computer implemented method of claim 7, wherein a position of the lower curve is adjustable by dragging a pointing device;
and wherein the at least partially overlaid 2D image of the patient is dynamically updated as a position of the pointing device is being dragged.

9. The computer implemented method of claim 1, wherein determining a limited set of parameters comprises:
x) determining a parameter indicative for a unique position of the tooth in a mouth; and
y) determining a limited set of parameters for describing the tooth in a clinical environment, comprising one or more or all of the following parameters:
at least two parameters (H,W; H,P) indicative of describing a size of said tooth;
at least one parameter (a1) for describing a first papilla height;
at least one parameter (a2) for describing a second papilla height;
at least two parameters (a3, a4, a5; a6, a7, a8) for describing a shape or a perceived shape of the tooth;
at least one parameter (a5, a9) for describing a first embrasure;
at least one parameter (a8, a10) for describing a second embrasure.

10. The computer implemented method of claim 9, wherein the limited set of parameters for describing the tooth in a clinical environment comprise the at least two parameter for describing the shape or perceived shape of the tooth, which comprise:
at least two parameters for describing a single transition line; or
at least three parameters for describing one transition curve; or
at least two parameters for describing two transition lines; or
at least five parameters for describing one transition line and one transition curve; or
at least six parameters for describing two transition curves.

11. The computer implemented method of claim 1, wherein searching and retrieving a limited number of candidate matching teeth for a tooth in the oral space comprises:
calculating a matching score based on the limited set of parameters of the tooth in the oral space as a first limited set, and obtaining a second limited set of parameters of a candidate matching tooth from the digital library, based on differences or deviations between corresponding parameters from the first limited set and the second limited set.

12. A computer device comprising computer-executable instructions, and at least one processor configured to execute the computer-executable instructions and cause the computer device to perform the method of claim 1, the computer device having or being connected to a display, and having or being connected to a pointing device.

13. A method of dental treatment of a patient, comprising:
generating a digital dental design of the oral space using the method according to claim 1;
producing at least one physical object based on said digital dental design;
mounting the physical object in an oral space of the patient.

14. The method of claim 13, further comprising: capturing a 2D picture of a smile or an oral space of a patient.

15. A storage medium comprising a file containing executable instructions which perform the method of claim 1, when being executed on a computer device having or being connected to a display, and having or being connected to a pointing device.

16. A computer arrangement comprising:
a computer device comprising at least one processor and a memory, the memory comprising an executable file;
a display connectable to, or connected to, or embedded in said computer device, and configured for displaying said 2D image;
a pointing device connectable to, or connected to, or embedded in said computer device, and configured for receiving user input;
wherein the executable file contains executable instructions which perform the method of claim 1, when being executed by said at least one processor.

* * * * *